US008842934B2

(12) United States Patent
Okuhara et al.

(10) Patent No.: US 8,842,934 B2
(45) Date of Patent: Sep. 23, 2014

(54) IMAGE PROCESSING APPARATUS AND METHOD FOR CONTROLLING THE IMAGE PROCESSING APPARATUS

(75) Inventors: Ryusuke Okuhara, Yokohama (JP); Jun Matsuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 600 days.

(21) Appl. No.: 13/184,339

(22) Filed: Jul. 15, 2011

(65) Prior Publication Data
US 2012/0020585 A1 Jan. 26, 2012

(30) Foreign Application Priority Data

Jul. 20, 2010 (JP) ................................. 2010-163301
Aug. 31, 2010 (JP) ................................. 2010-194047

(51) Int. Cl.
*G06K 9/00* (2006.01)
*G06K 9/62* (2006.01)
*G06K 9/36* (2006.01)
*G06K 9/32* (2006.01)
*G06K 15/00* (2006.01)
*G06T 11/60* (2006.01)
*G06F 3/12* (2006.01)

(52) U.S. Cl.
CPC .............. *G06F 3/1252* (2013.01); *G06T 11/60* (2013.01); *G06F 3/1219* (2013.01); *G06F 3/1208* (2013.01); *G06F 3/1204* (2013.01)
USPC ........... 382/284; 382/100; 382/225; 382/295; 358/1.18

(58) Field of Classification Search
CPC ...................................................... G06T 11/60

USPC ................................... 382/100, 225, 284, 295
See application file for complete search history.

(56) References Cited

U.S. PATENT DOCUMENTS

| 6,636,648 | B2 * | 10/2003 | Loui et al. ..................... 382/284 |
| 6,934,052 | B2 * | 8/2005 | Venable ........................ 358/1.18 |
| 7,124,360 | B1 * | 10/2006 | Drenttel et al. ............... 715/205 |
| 7,395,510 | B2 * | 7/2008 | Diwan et al. .................. 715/801 |
| 7,697,785 | B2 * | 4/2010 | Chiu et al. ..................... 382/284 |
| 7,765,470 | B2 * | 7/2010 | Epstein ......................... 715/243 |
| 8,049,922 | B2 * | 11/2011 | Murata et al. .................. 358/1.2 |

(Continued)

FOREIGN PATENT DOCUMENTS

| CN | 1905001 A | 1/2007 |
| CN | 101124819 A | 2/2008 |

(Continued)

*Primary Examiner* — Utpal Shah
(74) *Attorney, Agent, or Firm* — Canon USA, Inc. IP Division

(57) ABSTRACT

An image processing apparatus, which can automatically arrange a plurality of images, includes a rectangle generation unit configured to divide the plurality of images into two or more groups and generate, for each group, a rectangle in which images of the group can be arranged. The image processing apparatus includes a determination unit configured to generate a new rectangle by combining two of the rectangles generated by the rectangle generation unit, in which a rectangle composed of the plurality of groups is generated in such a way as to locate all frames of the plurality of images in the rectangle, and further configured to determine a layout of frames of the plurality of images. The image processing apparatus further includes an image generation unit configured to generate an image of the plurality of images disposed in one rectangle based on the layout of the frames of the plurality of images determined by the determination unit.

25 Claims, 20 Drawing Sheets

(56) References Cited

U.S. PATENT DOCUMENTS

| | | | | |
|---|---|---|---|---|
| 8,065,627 | B2* | 11/2011 | Atkins | 715/788 |
| 8,139,826 | B2* | 3/2012 | Ryuto et al. | 382/118 |
| 8,628,087 | B2* | 1/2014 | Knowlton et al. | 273/157 R |
| 2002/0122067 | A1* | 9/2002 | Geigel et al. | 345/788 |
| 2009/0268983 | A1* | 10/2009 | Stone et al. | 382/284 |

FOREIGN PATENT DOCUMENTS

| | | |
|---|---|---|
| JP | H11-250272 A | 9/1999 |
| JP | 2005-079817 A | 3/2005 |
| JP | 2008-289075 A | 11/2008 |
| JP | 2009-241545 A | 10/2009 |
| JP | 2010-072927 A | 4/2010 |

* cited by examiner

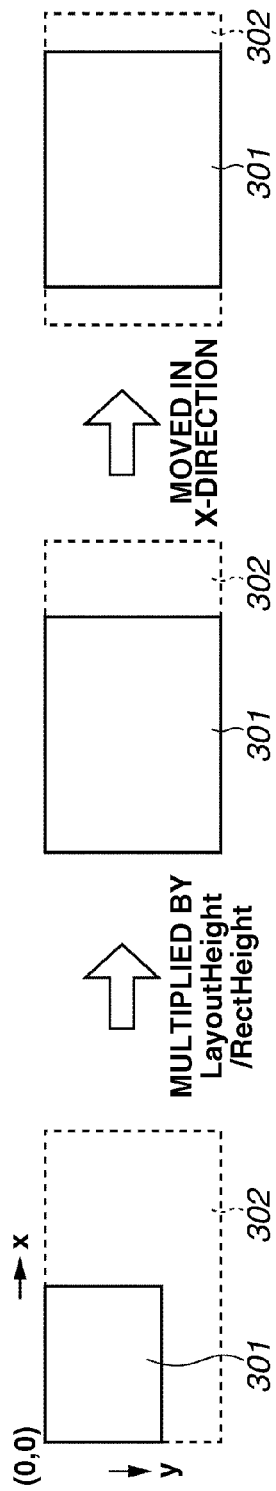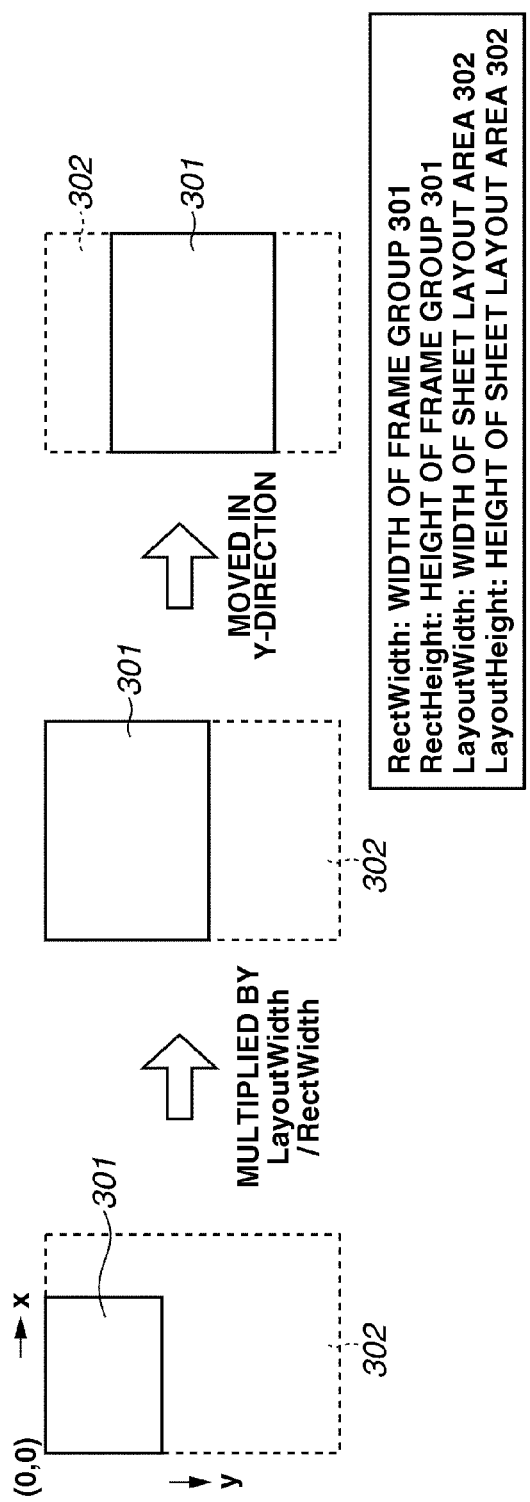

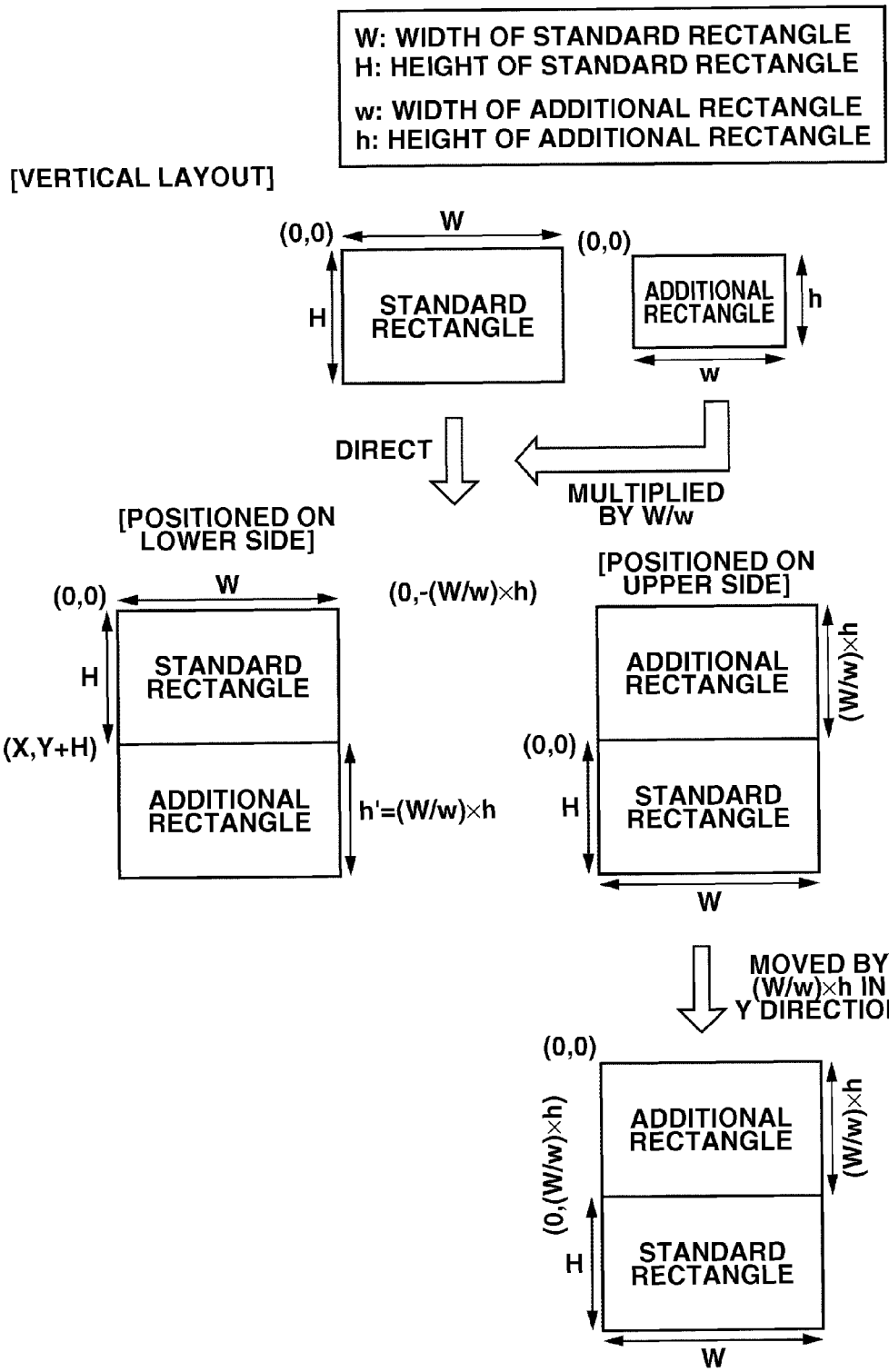

FIG.9

| TOTAL NUMBER OF FRAMES (N) | GROUP NUMBER (k) | | | | | |
|---|---|---|---|---|---|---|
| | 1 | 2 | 3 | 4 | 5 | 6 |
| 1 | 1 | | | | | |
| 2 | 1 | 1 | | | | |
| 3 | 1 | 1 | 1 | | | |
| 4 | 1 | 3 | | | | |
| 5 | 1 | 2 | 2 | | | |
| 6 | 1 | 2 | 3 | | | |
| 7 | 1 | 1 | 3 | 2 | | |
| 8 | 1 | 1 | 3 | 3 | | |
| 9 | 1 | 2 | 3 | 3 | | |
| 10 | 1 | 1 | 3 | 5 | | |
| 11 | 1 | 2 | 3 | 5 | | |
| 12 | 1 | 2 | 3 | 6 | | |
| 13 | 1 | 3 | 3 | 6 | | |
| 14 | 1 | 3 | 4 | 6 | | |
| 15 | 1 | 2 | 2 | 4 | 6 | |
| 16 | 1 | 2 | 3 | 4 | 6 | |
| 17 | 1 | 2 | 3 | 5 | 6 | |
| 18 | 1 | 2 | 2 | 3 | 4 | 6 |
| 19 | 1 | 1 | 3 | 3 | 5 | 6 |
| 20 | 1 | 2 | 3 | 3 | 5 | 6 |

$N = \Sigma \text{Num}[N][k]$
$\text{Num}[N][0] = 1$

FIG.10A
COMBINATION PATTERN OF TWO FRAMES
PATTERN 2-1
(VERTICAL COMBINATION ONLY)
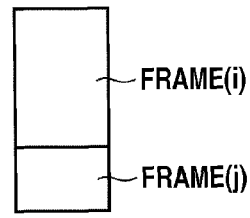
PATTERN 2-2
(HORIZONTAL COMBINATION ONLY)
FIG.10B
COMBINATION PATTERN OF THREE FRAMES
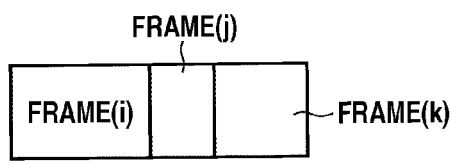
PATTERN 3-1
(VERTICAL COMBINATION ONLY)
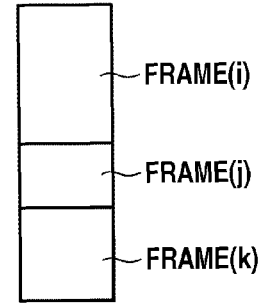
PATTERN 3-2
(HORIZONTAL COMBINATION ONLY)
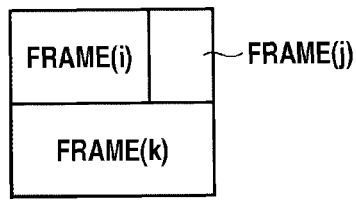
PATTERN 3-3
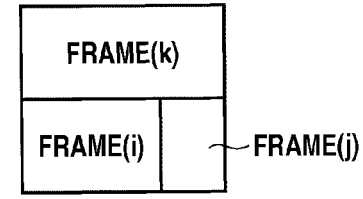
PATTERN 3-4
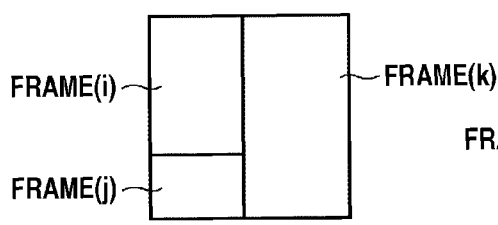
PATTERN 3-5
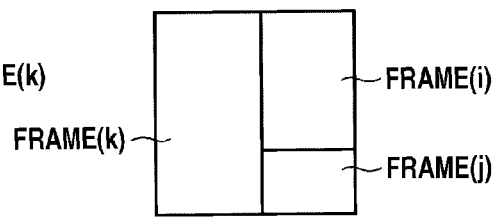
PATTERN 3-6

FIG.10C
COMBINATION PATTERN OF FOUR FRAMES
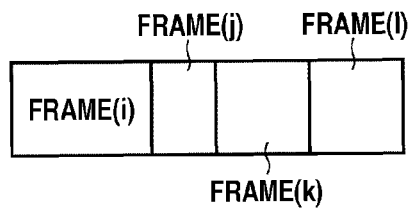
PATTERN 4-1
(VERTICAL COMBINATION ONLY)
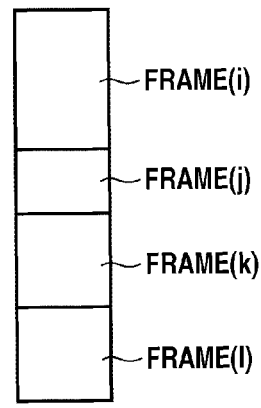
PATTERN 4-2
(HORIZONTAL COMBINATION ONLY)
FIG.10D
COMBINATION PATTERN OF FIVE FRAMES
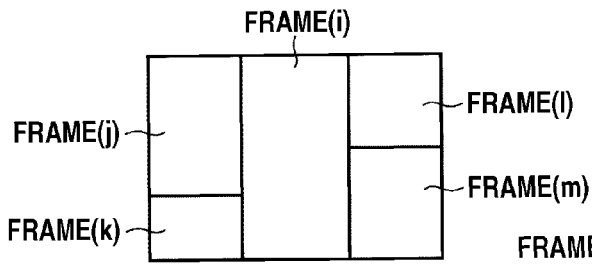
PATTERN 5-1
(VERTICAL COMBINATION ONLY)
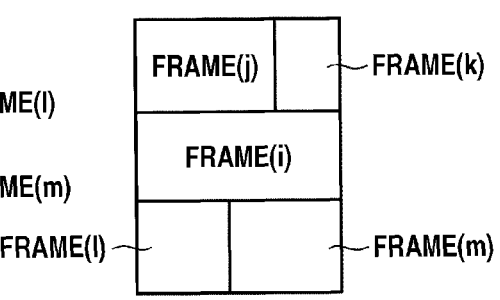
PATTERN 5-2
(HORIZONTAL COMBINATION ONLY)

FIG.10E
COMBINATION PATTERN OF SIX FRAMES
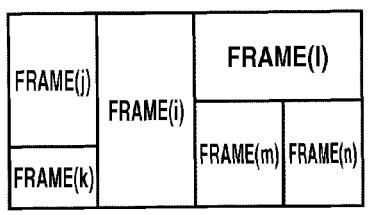
PATTERN 6-1 (VERTICAL COMBINATION ONLY)
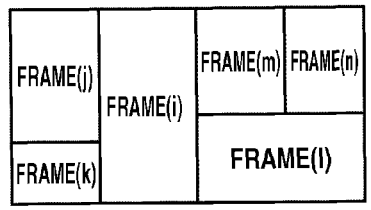
PATTERN 6-2 (VERTICAL COMBINATION ONLY)
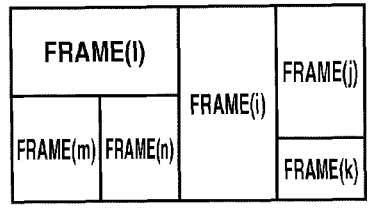
PATTERN 6-3 (VERTICAL COMBINATION ONLY)
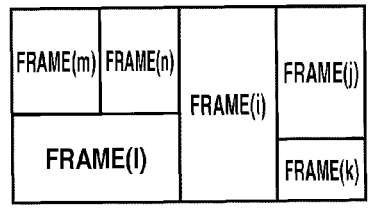
PATTERN 6-4 (VERTICAL COMBINATION ONLY)
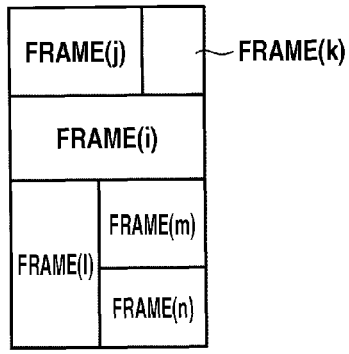
PATTERN 6-5 (HORIZONTAL COMBINATION ONLY)
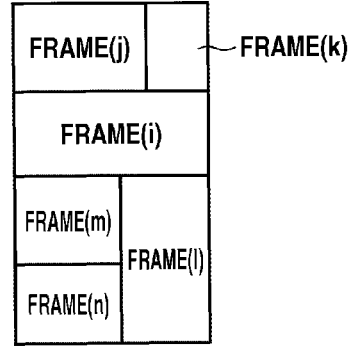
PATTERN 6-6 (HORIZONTAL COMBINATION ONLY)
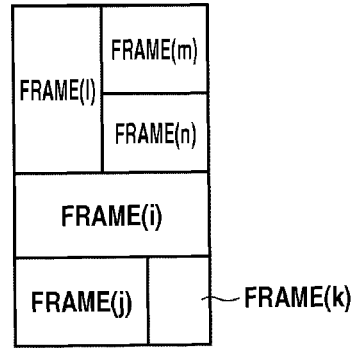
PATTERN 6-7 (HORIZONTAL COMBINATION ONLY)
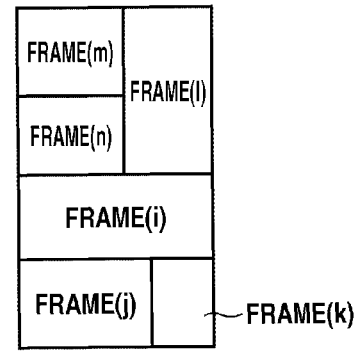
PATTERN 6-8 (HORIZONTAL COMBINATION ONLY)

IMAGE PROCESSING APPARATUS AND METHOD FOR CONTROLLING THE IMAGE PROCESSING APPARATUS

BACKGROUND OF THE INVENTION

1. Field of the Invention

The present invention relates to an image processing apparatus and an image processing method that can be preferably used to perform printing of a plurality of images on a piece of sheet.

2. Description of the Related Art

In general, an image processing apparatus can print a plurality of images on a piece of sheet. However, in many cases, the image processing apparatus performs printing by adjusting respective images to have similar sizes and arranging the adjusted images at designated positions. More specifically, equal spacing is employed to determine the size and the position of each image. In this case, the plurality of images when printed on the sheet and observed as one print product may be evaluated as a monotonous print product.

Further, as discussed in Japanese Patent Application Laid-Open No. 2005-79817, there is a conventional technique to determine the layout of a plurality of images in such a manner that the center position of each image becomes an integer multiple of a golden ratio so that an overlap between images can be eliminated. Further, a technique capable of realizing an irregularly disposed state of a plurality of images using a plurality of types of overlapped templates is discussed in Japanese Patent Application Laid-Open No. 2008-289075.

However, according to the technique discussed in Japanese Patent Application Laid-Open No. 2005-79817, many blank portions tend to be generated between neighboring images and many useless portions remain on a sheet. Further, according to the technique discussed in Japanese Patent Application Laid-Open No. 2008-289075, an image whose size does not fit the template may be cut (deleted) in part undesirably.

SUMMARY OF THE INVENTION

The present invention is directed to an image processing apparatus and a method for controlling the image processing apparatus, which can arrange a plurality of images in such a way as to maintain an aspect ratio of each image without generating any useless blank between neighboring images.

According to an aspect of the present invention, an image processing apparatus can automatically arrange a plurality of images in such a way as to calculate a layout of the plurality of images while maintaining an aspect ratio of each image. The image processing apparatus includes a rectangle generation unit configured to divide the plurality of images into two or more groups and generate, for each group, a rectangle in which images of the group can be arranged. The rectangle generation unit is further configured to generate the rectangle in such a way as to locate the images belonging to the same group in one rectangle. The image processing apparatus further includes a rectangle combination unit configured to generate a new rectangle by combining two of the rectangles generated by the rectangle generation unit. The rectangle combination unit is further configured to perform generation of another new rectangle by combining the rectangle generated by the rectangle combination unit with a rectangle generated by the rectangle generation unit. The image processing apparatus further includes a determination unit configured to cause the rectangle combination unit to repeat rectangle combination to generate a rectangle composed of the plurality of groups, in which all of the plurality of images are disposed, and configured to determine a layout of the plurality of images.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 6A and 6B illustrate example methods for adjusting the size and the position of a frame group according to the first exemplary embodiment of the present invention.

FIG. 7A illustrates a method for generating a frame group composed of two frames arranged along the vertical direction according to the first exemplary embodiment of the present invention.

FIG. 9 is a table illustrating a method for dividing N pieces of frames into a plurality of groups according to the first exemplary embodiment of the present invention.

FIGS. 10-1A, 10-1B, and 10-1C illustrate example methods for generating a rectangle of a group number k according to the first exemplary embodiment of the present invention.

FIGS. 10-2D and 10-2E illustrate example methods for generating a rectangle of the group number k according to the first exemplary embodiment of the present invention.

DESCRIPTION OF THE EMBODIMENTS

Various exemplary embodiments, features, and aspects of the invention will be described in detail below with reference to the drawings.

Figure 1:
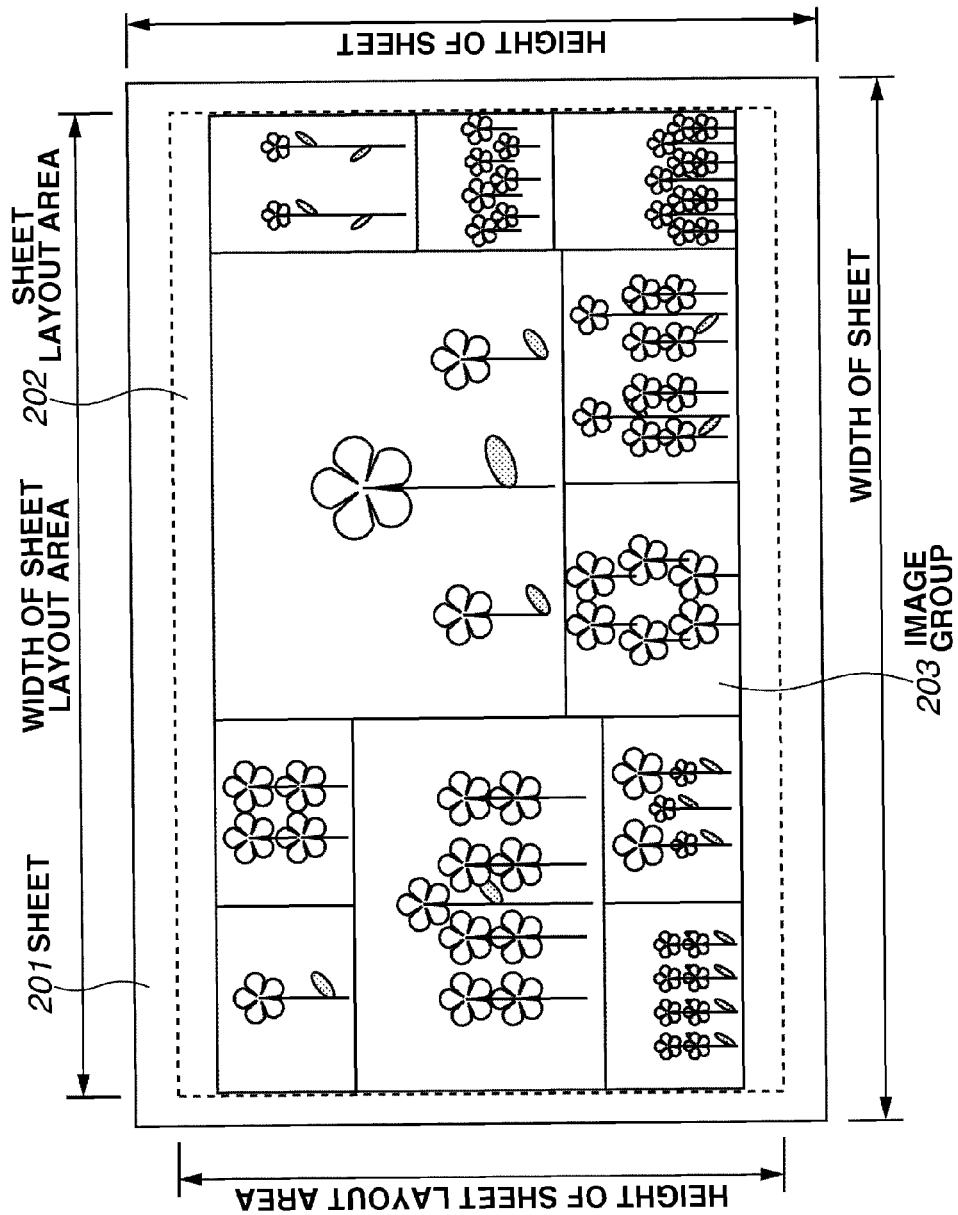
FIG. 1 illustrates an example image that can be generated by a printing apparatus.

First, features common to respective exemplary embodiments are described. FIG. 1 illustrates an example image that can be generated by a printing apparatus (an image processing apparatus) according to an exemplary embodiment of the present invention. According to the example illustrated in FIG. 1, a sheet 201 includes a rectangular layout area (i.e., a printable area) 202 having been set based on, for example, a designation by a user.

Further, on the sheet 201, a plurality of images (eleven images in the present exemplary embodiment) designated by a user are disposed irregularly (at random) without any clearance therebetween to form an image group 203 whose outer periphery is rectangular.

Each image has a magnification having been appropriately adjusted and may not coincide with the one designated by the user. More specifically, the size of each image is appropriately changed compared to the one designated by the user. On the other hand, the aspect ratio of each image coincides with the one designated by the user, except for a case where a calculation error occurs due to reduction or enlargement.

Further, a pair of parallel edge lines (i.e., one of two sets of parallel edge lines) that constitute the outer periphery of the image group 203 is completely overlapped with a pair of parallel edge lines (i.e., one of two sets of parallel edge lines) that constitute the layout area 202.

In an exemplary embodiment of the present invention, the printing apparatus generates the image group 203 having the layout illustrated in FIG. 1, from a plurality of images, on a piece of sheet.

Figure 2:
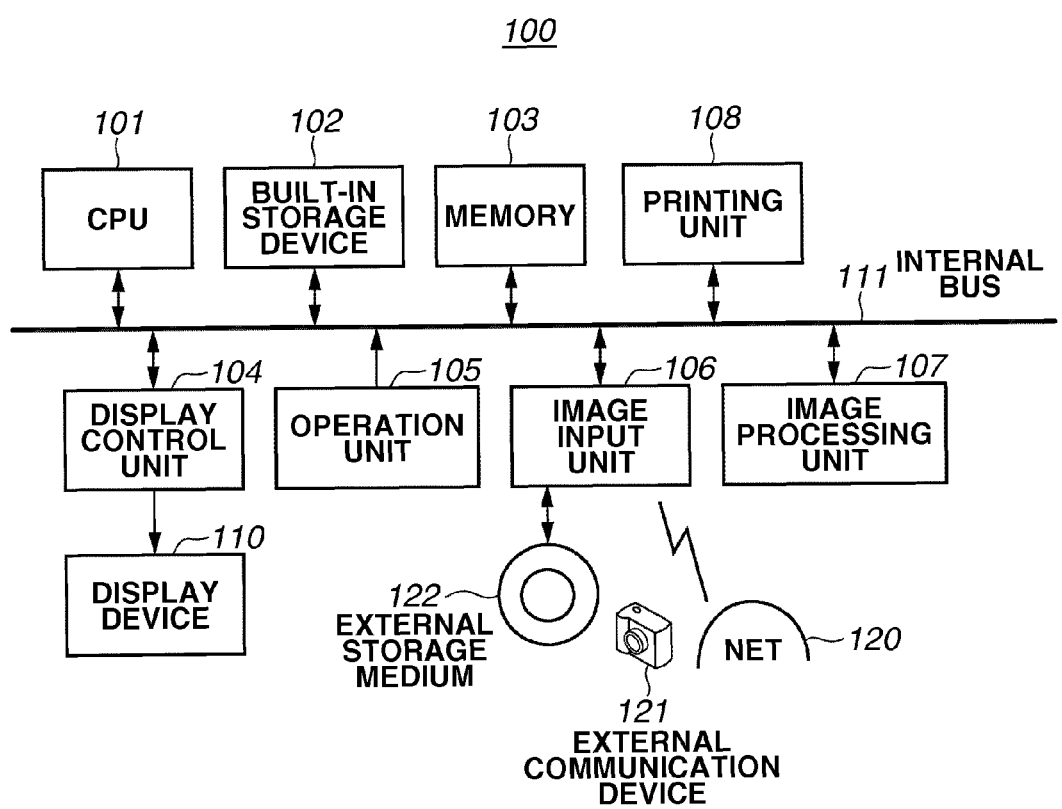
FIG. 2 schematically illustrates an internal configuration of a printing apparatus according to an exemplary embodiment of the present invention.

Next, an internal configuration of a printing apparatus according to an exemplary embodiment is described below. FIG. 2 schematically illustrates an example internal configuration of a printing apparatus 100.

The printing apparatus 100 includes a central processing unit (CPU) 101, a built-in storage device 102, a memory 103, a display control unit 104, an operation unit 105, an image input unit 106, an image processing unit 107, and a printing unit 108, which are mutually connected via an internal bus 111. Accordingly, the CPU 101, the built-in storage device 102, the memory 103, the display control unit 104, the operation unit 105, the image input unit 106, the image processing unit 107, and the printing unit 108 can mutually transmit and receive data via the internal bus 111.

The built-in storage device 102 stores data (e.g., image data) and various programs that the CPU 101 requires in its operation. The memory 103 is, for example, a random access memory (RAM). The operation unit 105 receives a user operation and generates a control signal according to the user operation. The generated control signal is supplied to the CPU 101.

For example, as an input device configured to receive a user operation, the operation unit 105 includes a character information input device (such as a keyboard), a pointing device (such as a mouse or a touch panel), and operation buttons. The touch panel is, for example, an input device configured to output coordinate information representing a touched position on a flat surface of an input unit.

The CPU 101 can receive a control signal generated by the operation unit 105, for example, according to a user operation, and reads out a program from the built-in storage device 102 based on the received control signal. The CPU 101 can control each unit constituting the printing apparatus 100 according to the readout program. In this case, the memory 103 can be appropriately used as a work memory of the CPU 101. In the above-described manner, the user can cause the printing apparatus 100 to perform an operation according to an instruction received via the operation unit 105.

The display control unit 104 outputs a display signal to display an image on a display device 110. For example, the CPU 101 generates a display control signal according to a program and supplies the generated display control signal to the display control unit 104. The display control unit 104 generates a display signal based on the received display control signal and outputs the generated display signal to the display device 110.

For example, the display control unit 104 causes the display device 110 to display a Graphical User Interface (GUI) screen, which constitutes a GUI, based on the display control signal generated by the CPU 101. If the operation unit 105 is a touch panel, the operation unit 105 can be integrated with the display device 110.

For example, the touch panel can be configured to have sufficient light transmissivity that does not disturb the display by the display device 110 and attached to an upper layer that covers a display screen of the display device 110. In this case, input coordinates of the touch panel are associated with display coordinates of the display device 110. Thus, it becomes feasible to configure the GUI that enables users to operate the screen displayed on the display device 110.

The image input unit 106 is, for example, a drive device or a communication interface that can transmit and receive data to and from an external storage medium 122. For example, the external storage medium 122, such as a compact disc (CD), a digital versatile disk (DVD), or a memory card, is attachable to or detachable from the drive device. The drive device performs processing for reading out data from the attached external storage medium 122 based on a control signal from the CPU 101. Further, the drive device performs processing for writing data into the external storage medium 122.

The communication interface performs communication with a network 120, such as a local area network (LAN) or Internet, based on a control from the CPU 101. Further, the communication interface performs communication with an external communication device 121, such as a portable telephone or a digital camera.

The image processing unit 107 is configured to perform image conversion processing (e.g., predetermined image interpolation, enlargement/reduction (resize) processing, and color conversion processing) on the image data acquired from the built-in storage device 102 and the image input unit 106. The image data having been subjected to the above-described image conversion processing has a format that the printing unit 108 can process.

The printing unit 108 is configured to receive the print image data having been converted to have the processible format from the image processing unit 107 and print the received image data on a sheet.

The operation unit 105 can be provided on an external computer that can perform communication with the printing apparatus 100. Further, the image data can be stored in the external computer.

Figure 3:
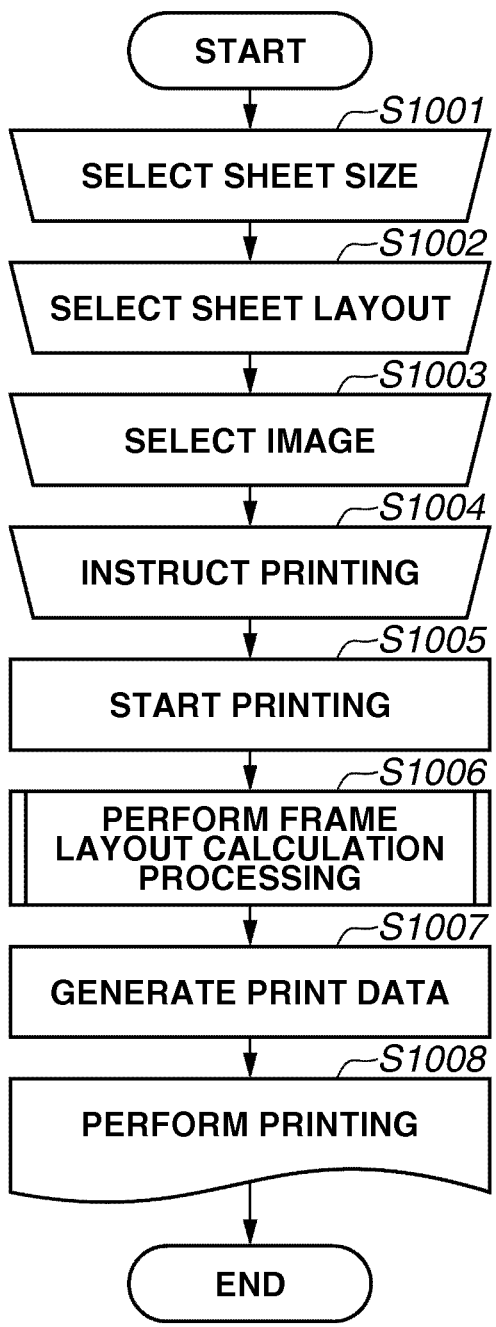
FIG. 3 is a flowchart schematically illustrating a printing method that can be realized by the printing apparatus according to an exemplary embodiment of the present invention.

The printing apparatus 100 having the above-described configuration can perform printing, for example, according to a flowchart illustrated in FIG. 3. FIG. 3 is a flowchart schematically illustrating a printing method that can be realized by the printing apparatus 100.

First, in step S1001, a user selects a sheet size. To perform the selection in step S1001, the user can operate the operation unit 105 or load sheets in the printing apparatus 100.

Next, in step S1002, the user selects a sheet layout. In this case, to execute an exemplary embodiment of the present invention, the user selects a sheet layout that entrusts the printing apparatus 100 to determine an appropriate layout. The CPU 101 sets a printable area (i.e., a layout area) based on the selection in step S1002. For example, the user can select a sheet layout titled as "automatic layout" or a sheet layout having a similar title.

Subsequently, in step S1003, the user selects a plurality of (i.e., N pieces of: N is a natural number) images to be printed, from images that are stored in the built-in storage device 102 or input via the image input unit 106. The user can perform the selection in step S1003, for example, by operating the operation unit 105. In this case, the user can perform trimming setting to designate a desired print range for each image. Further, the user can perform rotation setting to designate the upward direction in the print processing.

Subsequently, in step S1004, the user operates the operation unit 105 to instruct the printing apparatus 100 to perform printing.

Next, in step S1005, the printing apparatus 100 starts print processing. Subsequently, in step S1006, the CPU 101 performs frame layout calculation processing on the plurality of images selected by the user. In the present exemplary embodiment, the frame layout indicates the position and the size of each image on a sheet. A detailed content of the frame layout is described below.

The data relating to the frame layout, i.e., the data calculated in step S1006, are stored in the memory 103. Subsequently, in step S1007, the CPU 101 reads out a plurality of images, which have been selected by the user, from the built-in storage device 102. The CPU 101 sends the readout plurality of images, together with the frame layout data having been calculated in step S1006 and stored in the memory 103, to the image processing unit 107. Further, the CPU 101 causes the image processing unit 107 to generate print data. Then, in step S1008, the CPU 101 causes the printing unit 108 to perform printing of the print data generated in step S1007 on the sheet.

Figure 4:
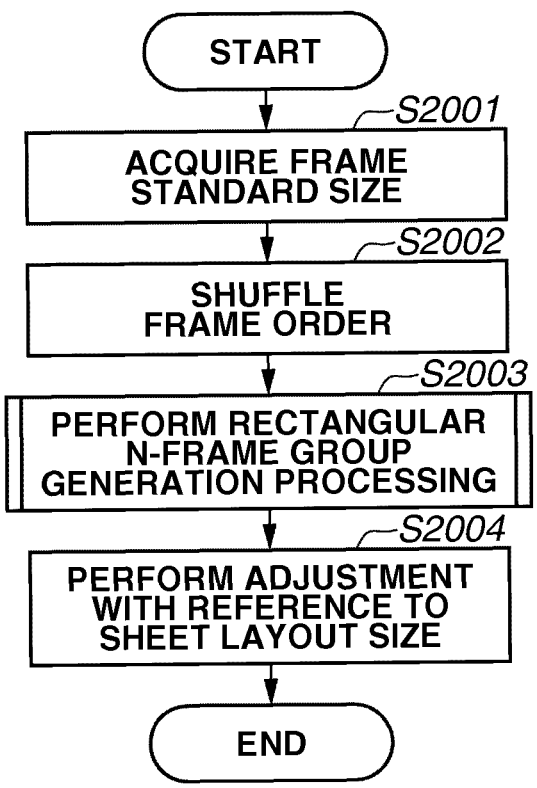
FIG. 4 is a flowchart schematically illustrating frame layout calculation processing according to a first exemplary embodiment of the present invention.

Next, the frame layout calculation processing, i.e., the processing to be executed in step S1006, according to a first exemplary embodiment is schematically described below. FIG. 4 is a flowchart schematically illustrating the processing to be performed in step S1006 according to the first exemplary embodiment.

To perform the processing in step S1006, first, in step S2001, the CPU 101 searches for the plurality of images selected by the user from the built-in storage device 102 or the image input unit 106 and acquires a frame standard size for each image. In the present exemplary embodiment, the frame standard size is initial values of the width and the height of the frame, which represent the width and the height in a state where images corresponding to respective frames are lined up in the head direction.

Figure 5A:
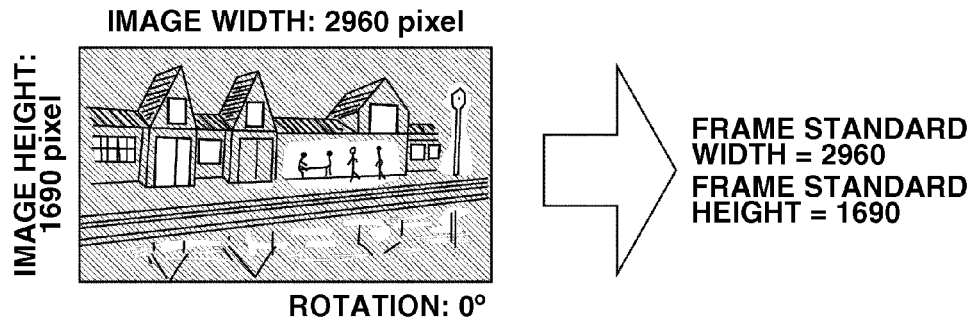
FIGS. 5A, 5B, and 5C illustrate example frame standard sizes.
Figure 5B:
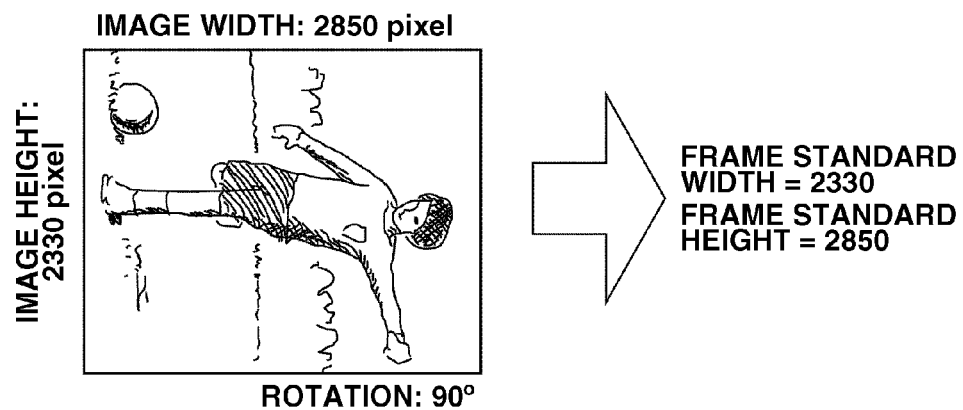
Figure 5C:
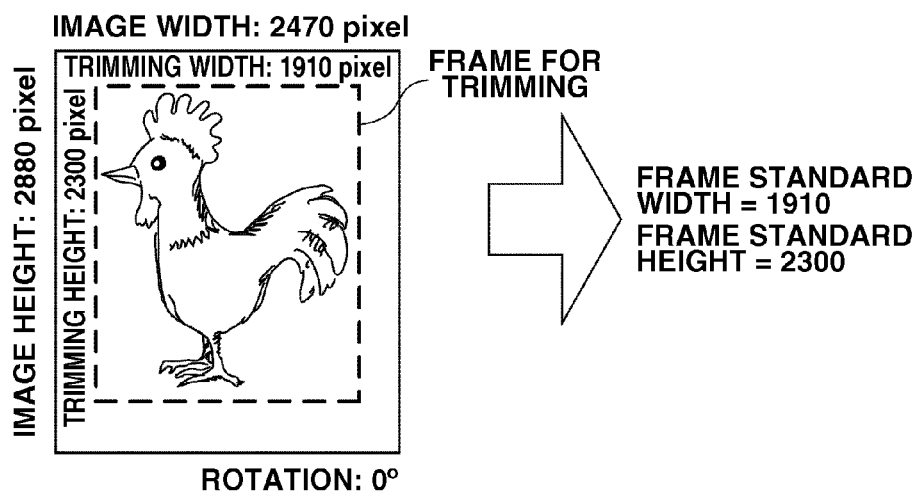

Some examples of the frame standard size according to the present exemplary embodiment are described below with reference to FIGS. 5A to 5C. FIG. 5A illustrates an example in a case where the information relating to the rotation indicates 0 degrees and the trimming setting by the user was not performed in step S1003. FIG. 5B illustrates an example in a case where the information relating to the rotation indicates 90 degrees and the trimming setting by the user was not performed in step S1003. FIG. 5C illustrates an example in a case where the information relating to the rotation indicates 0 degrees and the trimming setting by the user was performed in step S1003. For example, the information relating to the rotation can be the latest one among information relating to the rotation associated with an image and information relating to the rotation designated by user in step S1003.

If the processing in step S2001 is completed, then in step S2002, the CPU 101 irregularly changes the order of frames. More specifically, the CPU 101 shuffles the order of the frames. The shuffle processing enables a user to obtain a different print product every time the user performs printing with the same setting by selecting the same images.

Next, in step S2003, the CPU 101 zooms a plurality of (N pieces of) images selected by the user at the same rate appropriately determined in both vertical and horizontal directions to generate a rectangular frame group (i.e., having a rectangular outer periphery) composed of N pieces of frames. In this case, the CPU 101 generates the rectangular frame group without generating any clearance between neighboring frames. A detailed content of the above-described processing is described below.

Subsequently, in step S2004, the CPU 101 adjusts the size and the position of the frame group and the N pieces of frames that constitute the frame group with reference to the sheet layout selected in step S1002.

FIGS. 6A and 6B illustrate example methods for adjusting the size and the position of a frame group. In the examples illustrated in FIGS. 6A and 6B, the origin is positioned on the upper left vertex of a rectangular printable area (i.e., a layout area 302). Further, an x axis represents a direction extending rightward from the origin and a Y axis represents a direction extending downward from the origin. Further, it is assumed that the upper left vertex of the rectangular frame group is positioned on the origin before the size and position adjustment is performed.

As illustrated in FIG. 6A, if the ratio of "the width of the frame group 301" to "the height of the frame group 301" is equal to or smaller than the ratio of "the width of the layout area 302" to "the height of the layout area 302", the CPU 101 multiplies (resizes) the width and the height of the frame group 301 by the ratio of "the height of the layout area 302" to "the height of the frame group 301."

As a result, the height of the frame group 301 coincides with the height of the layout area 302. Then, the CPU 101 moves the frame group 301 along the x axis by an amount equivalent to a half of ("the width of the layout area 302"–"the width of the resized frame group 301"). As a result, the frame group 301 is positioned at the center of the layout area 302.

On the other hand, as illustrated in FIG. 6B, if the ratio of "the width of the frame group 301 " to "the height of the frame group 301" is greater than the ratio of "the width of the layout area 302 " to "the height of the layout area 302", the CPU 101 multiplies (resizes) the width and the height of the frame group 301 by the ratio of "the width of the layout area 302 " to "the width of the frame group 301."

As a result, the width of the frame group 301 coincides with the width of the layout area 302. Then, the CPU 101 moves the frame group 301 along the y axis by an amount equivalent to a half of ("the height of the layout area 302"–"the height of the resized frame group 301"). As a result, the frame group 301 is positioned at the center of the layout area 302.

More specifically, the frame group 301 is completely accommodated in the layout area 302. Further, the size and the position of the frame group 301 can be adjusted in such a manner that a pair of parallel edge lines (i.e., one of two sets of parallel edge lines) constituting the frame group 301 is completely overlapped with a pair of parallel edge lines (i.e., one of two sets of parallel edge lines) constituting the layout area 302.

In addition to the above-described size and position adjustment of the frame group illustrated in FIGS. 6A and 6B, the CPU 101 can perform similar size/position adjustment processing on the N pieces of images that constitute the frame group.

As a result of the above-described processing, which is performed by the CPU 101, the N pieces of images selected by the user can be disposed in one rectangle without causing any clearance between neighboring images, except for right and left marginal portions and/or upper and lower marginal portions on the layout area (printable area) 302. In this respect, the CPU 101 is functionally operable as an image generation unit.

In this case, it is feasible to completely eliminate any clearance. Alternatively, it is useful to add a line or a blank having a predetermined width between frames to clearly discriminate each image. In any case, a composite image including N pieces of images can be generated without generating any useless blank area.

Next, the frame group generation processing to be performed in step S2003 is described below in detail. First, a method for generating a frame group composed of two frames is described. Subsequently, a method for generating a frame group composed of three or more frames is described.

Figure 7B:
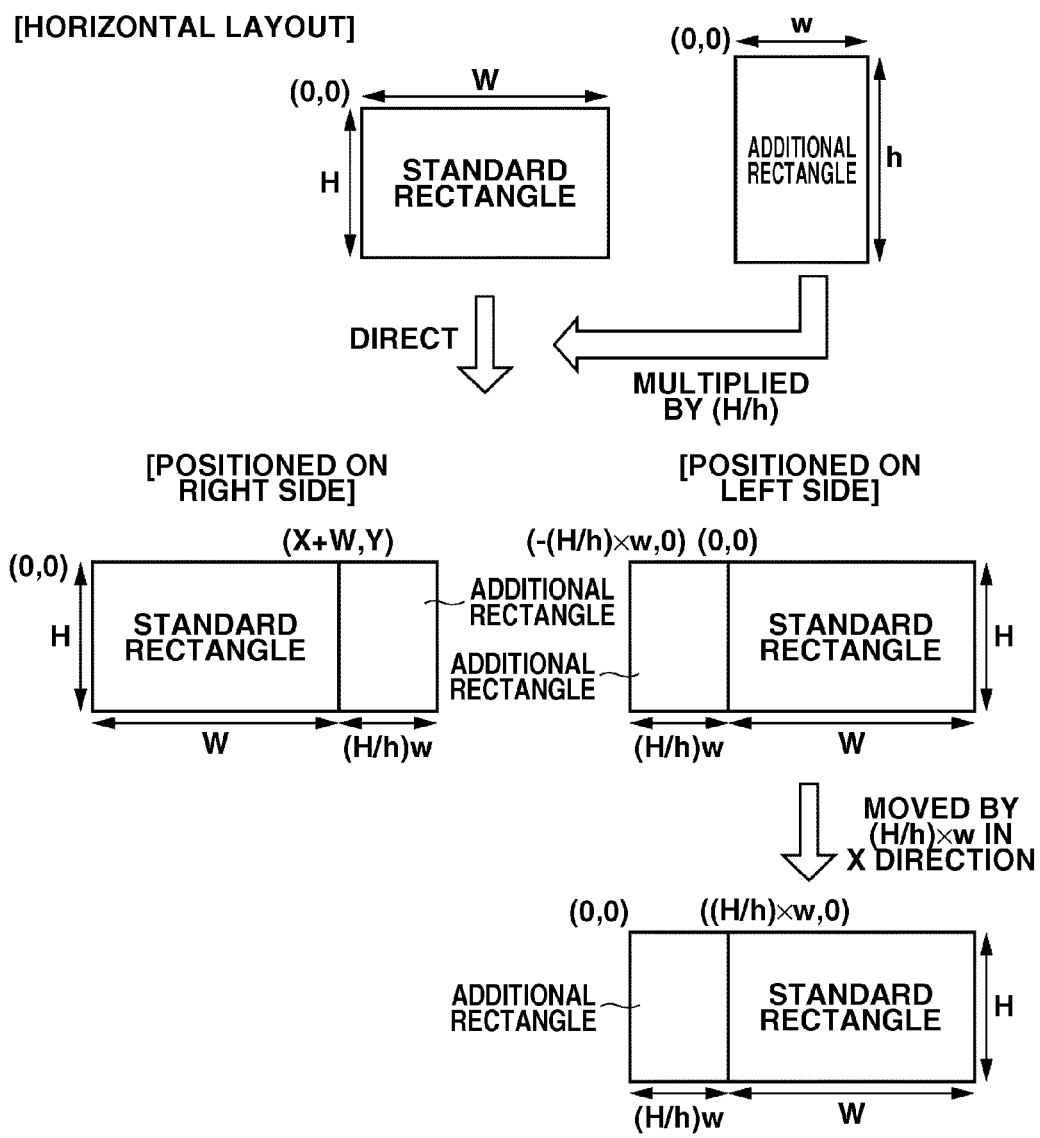
FIG. 7B illustrates a method for generating a frame group composed of two frames arranged along the horizontal direction according to the first exemplary embodiment of the present invention.

FIG. 7A illustrates an example method for generating a frame group composed of two frames that are arranged along the vertical direction. FIG. 7B illustrates an example method for generating a frame group composed of two frames that are arranged along the horizontal direction.

In a case where two frames are arranged along the vertical direction to generate a frame group, first as illustrated in FIG. 7A, the CPU 101 sets a standard rectangle having an external shape identical to that of either one of these two frames and an additional rectangle having an external shape identical to that of the other of these two frames.

Next, the CPU 101 multiplies (resizes) the width and the height of the additional rectangle by a ratio of "the width of the standard rectangle" to "the width of the additional rectangle." As a result, the width of the standard rectangle coincides with the width of the resized additional rectangle.

Subsequently, the CPU 101 sets coordinates of the additional rectangle. In this case, the additional rectangle can be disposed beneath the standard rectangle if the coordinates of the additional rectangle are set to be equal to (X coordinate of the standard rectangle, Y coordinate of the standard rectangle+the height of the standard rectangle).

On the other hand, the additional rectangle can be disposed above the standard rectangle if the coordinates of the additional rectangle are set to be equal to (X coordinate of the standard rectangle, Y coordinate of the standard rectangle−the height of the resized additional rectangle). When the above-described additional rectangle resize and coordinate setting is performed, a frame group having a rectangular outer peripheral shape can be generated.

Further, the width of the frame group coincides with the width of the standard rectangle. The height of the frame group coincides with a sum of the height of the standard rectangle and the height of the resized additional rectangle.

In a case where two frames are arranged along the horizontal direction to generate a frame group, first as illustrated in FIG. 7B, the CPU 101 sets a standard rectangle having an external shape identical to that of either one of these two frames and an additional rectangle having an external shape identical to that of the other of these two frames.

Next, the CPU 101 multiplies (resizes) the width and the height of the additional rectangle by a ratio of "the height of the standard rectangle" to "the height of additional rectangle."

As a result, the height of the standard rectangle coincides with the height of the resized additional rectangle.

Subsequently, the CPU 101 sets coordinates of the additional rectangle. In this case, the additional rectangle can be disposed on the right side of the standard rectangle if the coordinates of the additional rectangle are set to be equal to (X coordinate of the standard rectangle+the width of the standard rectangle, Y coordinate of the standard rectangle).

On the other hand, the additional rectangle can be disposed on the left side of the standard rectangle if the coordinates of the additional rectangle are set to be equal to (X coordinate of the standard rectangle−the width of the resized additional rectangle, Y coordinate of the standard rectangle).

When the above-described additional rectangle resize and coordinate setting is performed, a frame group having a rectangular outer peripheral shape can be generated. Further, the width of the frame group coincides with a sum of the width of the standard rectangle and the width of the resized additional rectangle. The height of the frame group coincides with the height of the standard rectangle.

As described above, except for calculation errors that may occur when images are reduced or enlarged, a rectangular frame group can be generated by combining the standard rectangle and an additional rectangle while maintaining aspect ratios thereof. In the present exemplary embodiment, it is presumed that the aspect ratios of two rectangles are substantially maintained at the same value if the aspect ratios are slightly changed due to calculation errors.

As described in detail below, each (or either one) of the standard rectangle and the additional rectangle can be a frame group having been obtained beforehand through the above-described processing. In this case, the frame group obtained through the above-described processing has a rectangular shape without any clearance between neighboring frames.

Figure 8:
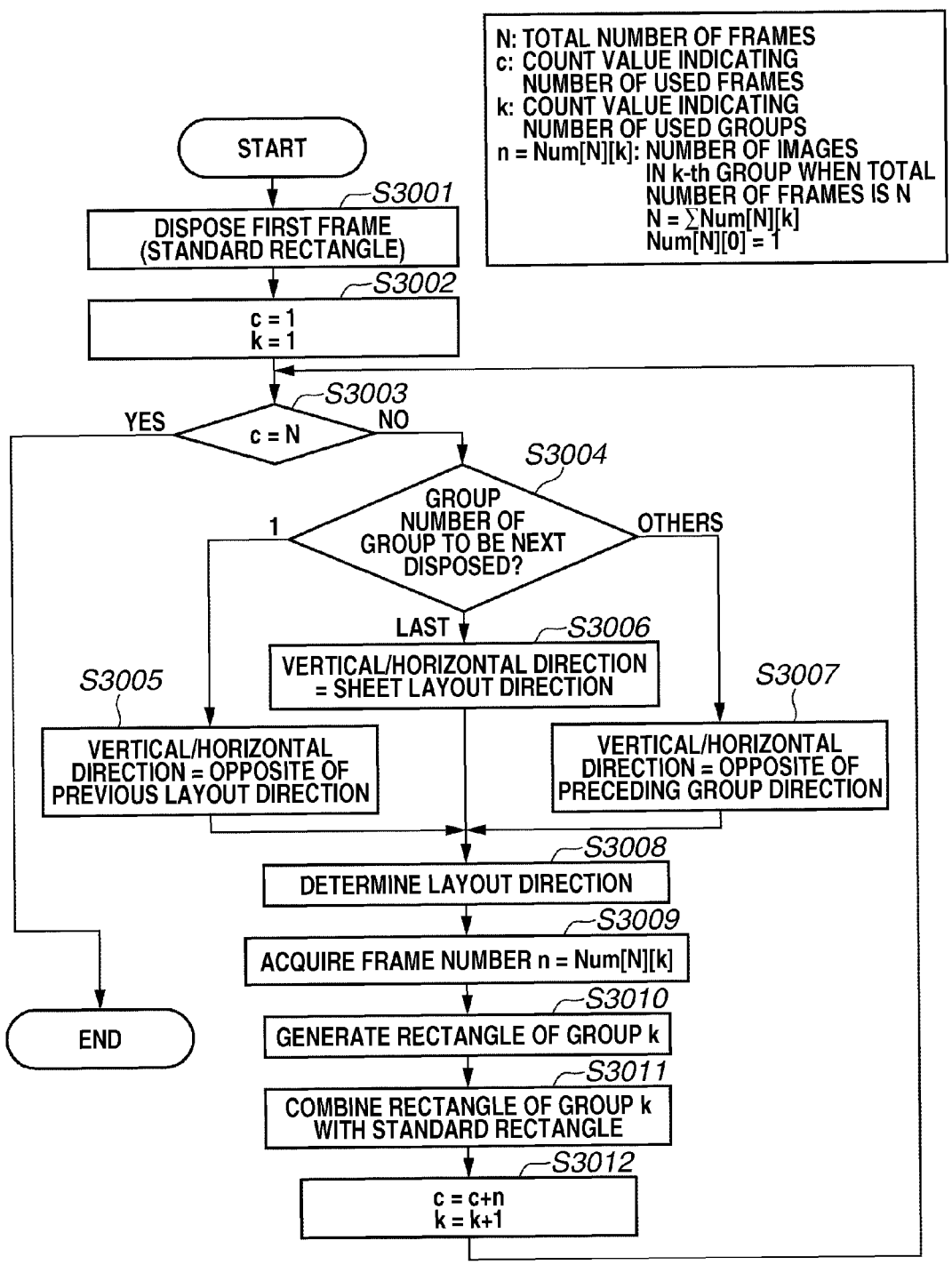
FIG. 8 is a flowchart illustrating a method for generating a frame group composed of N pieces of frames according to the first exemplary embodiment of the present invention.

The following processing can be performed in a case where three or more frames are combined to generate a frame group. FIG. 8 is a flowchart illustrating an example method for generating a frame group composed of N pieces of frames.

To execute the above-described processing (step S2003), first in step S3001, the CPU 101 disposes the first frame as an initial standard rectangle. In this case, the CPU 101 sets the origin of the standard rectangle to be (0, 0). Further, the CPU 101 sets the width of the standard rectangle to be identical to a standard size width of the first frame and sets the height of the standard rectangle to be identical to a standard size height of the first frame.

Next, in step S3002, the CPU 101 initializes a count value c that represents the number of used frames. The CPU 101 further initializes a group number k that represents a group to be next disposed. In this respect, the CPU 101 is functionally operable as a division unit. In the context of the present disclosure, the technical terminology "group" indicates each one of a plurality of groups that can be obtained by dividing N pieces of frames. Each group includes at least one frame, for example, as illustrated in FIG. 9.

According to the example table illustrated in FIG. 9, for example, if the total number of frames (N) is eleven, i.e., N=11, eleven frames are separated into four groups, i.e., a group composed of one frame, a group composed of two frames, a group composed of three frames, and a group composed of five frames. A frame group composed of N pieces of frames can be generated by successively generating a standard rectangle or an additional rectangle, which is composed of the frames disposed in each group, and then appropriately combining the generated rectangles. In this case, a group 1 has a constant value of 1 and represents a frame 1 subjected to the first layout.

If the processing in step S3002 is completed, then in step S3003, the CPU 101 compares the count value c (i.e., the value representing the number of used frames) with the value N. If the count value c is equal to the value N, i.e., c=N (YES in step S3003), the CPU 101 terminates the processing of the flowchart illustrated in FIG. 8 because the layout of all frames is already completed. On the other hand, if the count value c is not equal to the value N, i.e., c≠N (NO in step S3003), the processing proceeds to step S3004 because it is necessary to determine the layout of a frame to be disposed.

In step S3004, the CPU 101 checks the group number k that represents a group to be next disposed. The CPU 101 determines a vertical/horizontal combination direction for the next group depending on the value of the group number k of the group to be next disposed. If the group number k is 1, the processing proceeds to step S3005. If the group number k is the last one, the processing proceeds to step S3006. Further, if the group number k is other value, the processing proceeds to step S3007.

In step S3005, the CPU 101 determines to perform a horizontal combination if the combination in the previously performed processing (layout calculation) is a vertical combination. The CPU 101 determines to perform the vertical combination if the combination in the previously performed processing (layout calculation) is the horizontal combination.

In step S3006, the CPU 101 compares an aspect ratio (height÷width) of the standard rectangle with an aspect ratio of the layout area. If the aspect ratio of the standard rectangle is greater than the aspect ratio of the layout area, the CPU 101 determines to perform the vertical combination. If the aspect ratio of the standard rectangle is equal to or less than the aspect ratio of the layout area, the CPU 101 determines to perform the horizontal combination.

In step S3007, the CPU 101 determines to perform the horizontal combination if the combination of a preceding group is the vertical combination. The CPU 101 determines to perform the vertical combination if the combination of the preceding group is the horizontal combination. As described above, the CPU 101 can determine the vertical/horizontal combination direction for the next group.

If the processing in steps S3005 to S3007 is completed, then in step S3008, the CPU 101 determines a combination direction at random. More specifically, the CPU 101 determines an upper or a lower combination direction at random if it is determined to perform the vertical combination. The CPU 101 determines a right or a left combination direction at random if it is determined to perform the horizontal combination. For example, a random number is usable to perform the above-described determination processing.

Next, in step S3009, the CPU 101 acquires a frame number n that represents the number of frames included in the group having the group number k. The value of the frame number n can be obtained, for example, from the table illustrated in FIG. 9 or can be acquired based on a calculation.

Subsequently, in step S3010, the CPU 101 generates an additional rectangle by combining all of n pieces of frames. In this respect, the CPU 101 is functionally operable as a rectangle generation unit. The generation of a rectangle of the group number k can be defined, for example, as illustrated in FIG. 10-1 and FIG. 10-2. More specifically, the layout of each frame included in a rectangle composed of two frames can be calculated, as illustrated in FIG. 10-1A, based on the examples illustrated in FIGS. 7A and 7B.

Further, the layout of each frame included in a rectangle composed of three frames can be calculated, as illustrated in FIG. 10-1B, by performing the calculation illustrated in FIG. 7A or FIG. 7B on two frames and then combining another frame with the rectangle composed of two frames.

Similarly, the layout of four frames can be calculated, as illustrated in FIG. 10-1C, based on a combination of (three frames+one frame) or (two frames+two frames). Further, the layout of five frames can be calculated, as illustrated in FIG. 10-2D, based on a combination of (three frames+two frames).

The layout of six frames can be calculated, as illustrated in FIG. 10-2E, based on a combination of (three frames+three frames). As described above, all frames are usable to generate a rectangle. More specifically, the CPU 101 can generate a rectangle for each group.

If there is a plurality of patterns for a designated frame number, the CPU 101 can arbitrarily select one of the plurality of layout patterns. For example, a random number is usable to perform the above-described selection processing.

If the processing in step S3010 is completed, then in step S3011, the CPU 101 combines the generated rectangle, as an additional rectangle, with the standard rectangle. For example, the CPU 101 can perform the above-described combination processing using the method illustrated in FIGS. 7A and 7B.

Next, in step S3012, the CPU 101 designates the rectangle obtained in the combination processing performed in step S3011 as a new standard rectangle. Further, the CPU 101 updates the count value c that represents the number of used frames and the group number k that represents a group to be next combined. Subsequently, the processing returns to step S3003 to perform the above-described determination processing gain.

When the above-described processing is performed for all frames, the CPU 101 can generate a frame group having a rectangular shape comparable to a large rectangle including N pieces of frames that are combined together without any clearance therebetween while adding a rectangle of another group to the rectangle of the basic group. In this respect, the CPU 101 is functionally operable as a determination unit.

Figure 11:
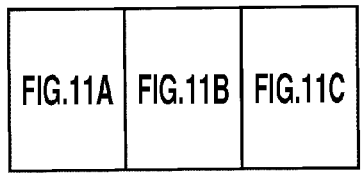
FIGS. 11, 11A, 11B and 11C illustrate an example method for generating a frame group when the total number of frames N is eleven according to the first exemplary embodiment of the present invention.
Figure 11A:
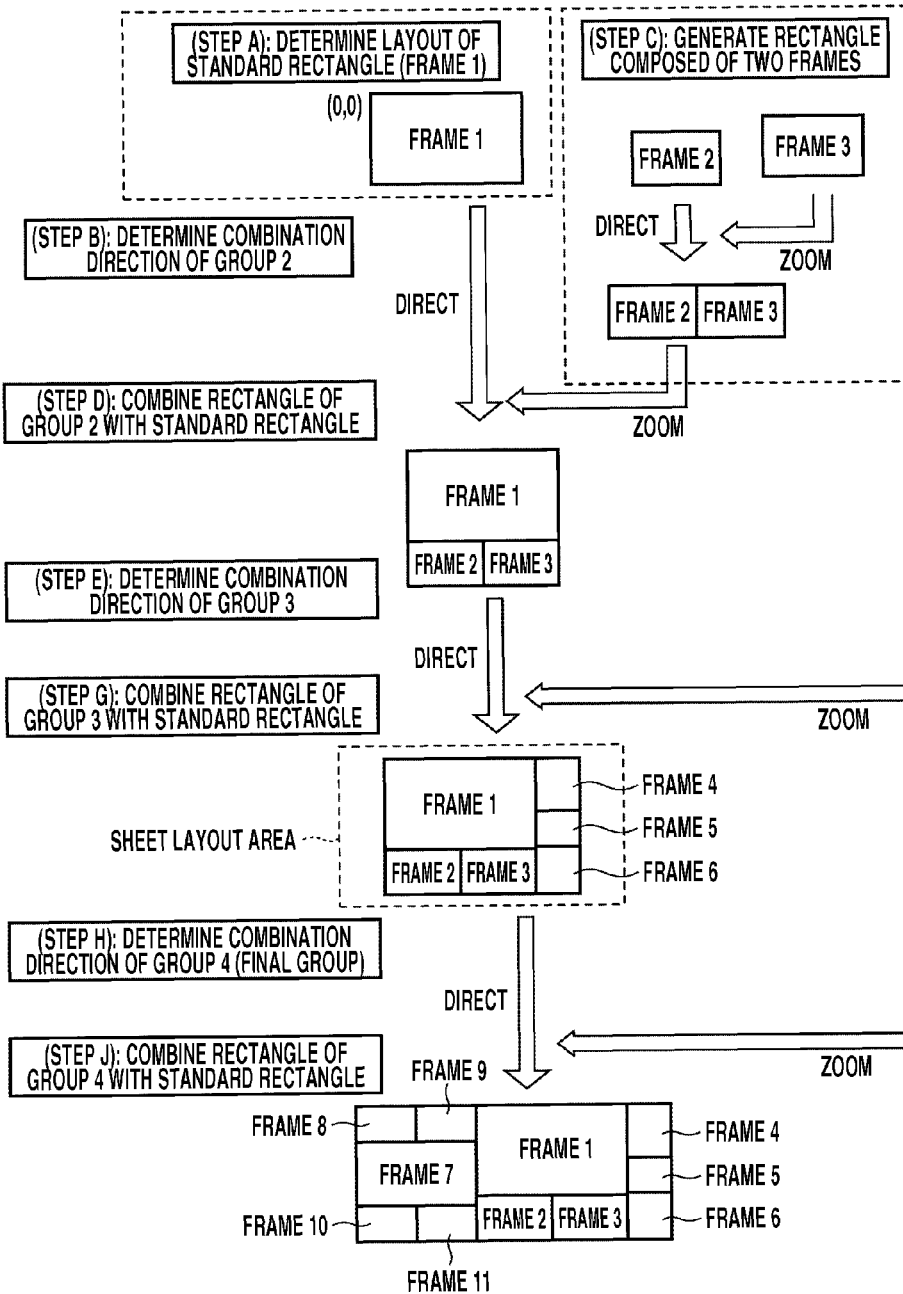
Figure 11B:
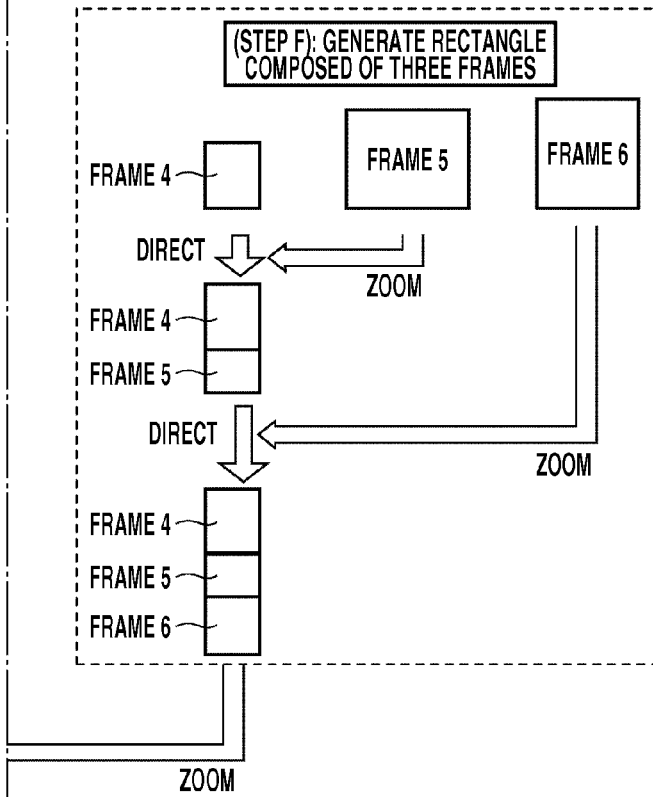
Figure 11C:
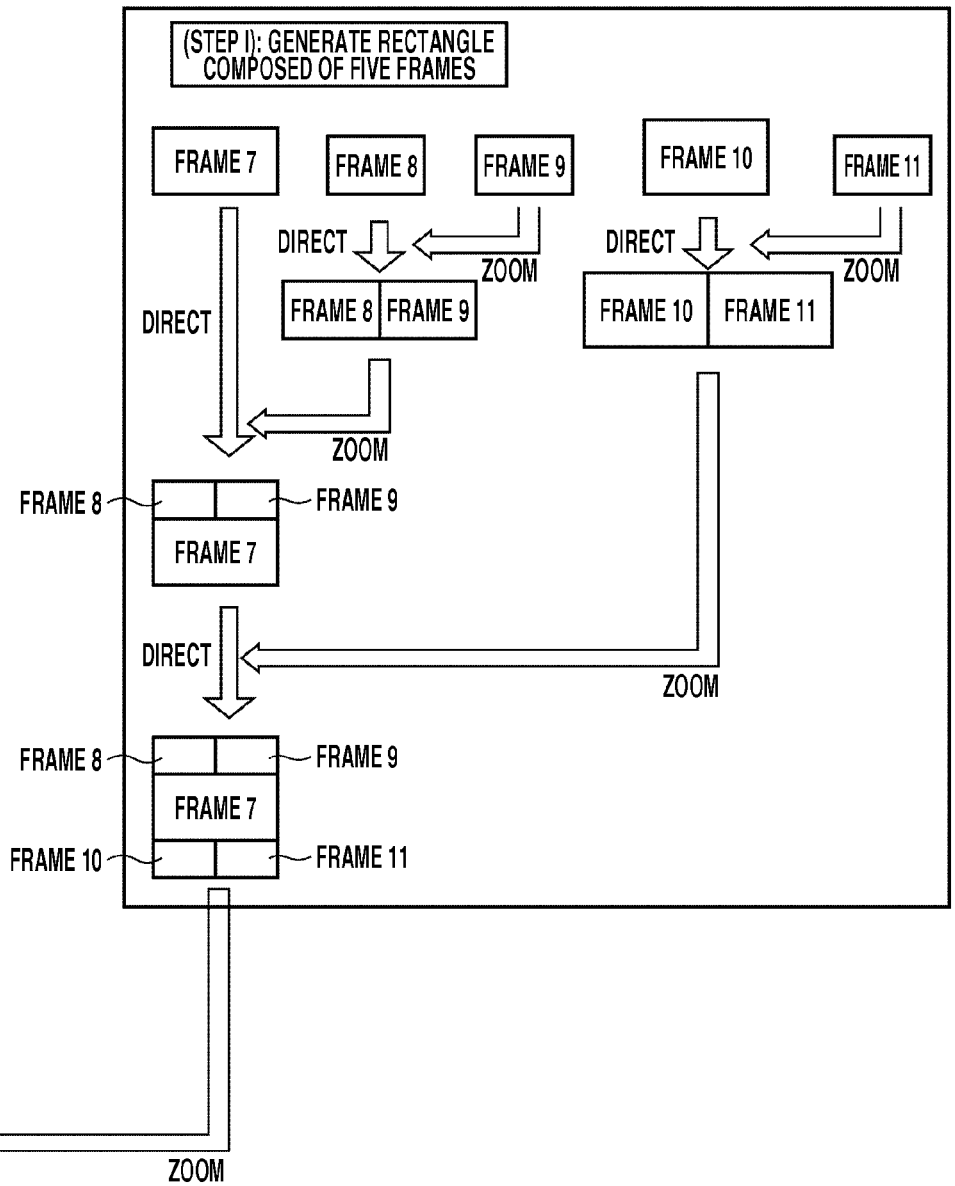

The frame group generation method described with reference to the flowchart illustrated in FIG. 8 is further described with reference to an example case where the total number of frames N is equal to 11. FIG. 11 illustrates an example method for generating a frame group when the total number of frames N is eleven. As illustrated in FIG. 9, when the total number of frames is eleven, the frames are separated into four groups, i.e., a group 1 including one frame, a group 2 including two frames, a group 3 including three frames, and a group 4 including five frames.

First, in step A, the CPU 101 determines a layout of frame 1. More specifically, the CPU 101 sets a standard rectangle having the origin at coordinates (0, 0). The standard rectangle has a width that is equal to a standard width of the frame 1. The standard rectangle has a height that is equal to a standard height of the frame 1.

Next, in step B, the CPU 101 determines a combination direction of the group 2. The vertical/horizontal combination direction of the group 2 is the opposite of the vertical/horizontal combination direction used in the previous layout calculation. If the combination in the previous processing is the horizontal combination, the vertical combination is set for the present processing. Further, it is presumed that the CPU 101 designates the lower combination as a result of random selection between the upper combination and the lower combination.

Subsequently, in step C, the CPU 101 generates a rectangle of the group 2. As the combination direction of the group 2 is the vertical direction, the CPU 101 selects a layout including two frames arranged in the horizontal direction as illustrated in FIG. 10-1A. The rectangle of the group 2 can be obtained by combining a frame 2 serving as a standard rectangle with a frame 3 serving as an additional rectangle according to the calculation method illustrated in FIG. 7B. As a result, the width and the height of the rectangle of the group 2 and each layout of the frame 2 and the frame 3 can be calculated.

Subsequently, in step D, the CPU 101 designates the group 2 as an additional rectangle and combines the group 2 with the frame 1 serving as the standard rectangle in such a way as to locate the additional rectangle (i.e., the group 2) on the lower side of the standard rectangle (i.e., the frame 1). Namely, the CPU 101 performs the combination processing of step S3011. In this case, the CPU 101 performs the calculation according to the method illustrated in FIG. 7A. As a result, a rectangle composed of the frame 1, the frame 2, and the frame 3 can be generated and the generated rectangle can be used as a new standard rectangle.

Next, in step E, the CPU 101 determines a combination direction of the group 3. As the combination direction of the group 2 is the vertical direction, the opposite combination direction (i.e., the horizontal direction) is set for the group 3. Further, it is presumed that the CPU 101 designates the right combination as a result of random selection between the right combination and the left combination.

Subsequently, in step F, the CPU 101 generates a rectangle composed of three frames (i.e., a frame 4, a frame 5, and a frame 6) of the group 3. In this case, as a combination pattern of three frames, it is presumed that the CPU 101 designates a pattern 3-2 as a result of random selection between the combination patterns of three frames illustrated in FIG. 10-1B.

First, according to the pattern 3-2, the CPU 101 designates the frame 4 as a standard rectangle and the frame 5 as an additional rectangle. The CPU 101 combines the frame 4 with the frame 5 in such a way as to locate the additional rectangle (i.e., the frame 5) on the lower side of the standard rectangle (i.e., the frame 4). Next, the CPU 101 designates the rectangle obtained by the above-described lower combination as a standard rectangle and the frame 6 as an additional rectangle. The CPU 101 combines the obtained rectangle with the frame 6 in such a way as to locate the additional rectangle on the lower side of the standard rectangle. A rectangle of the group 3 can be generated through the above-described processing.

Subsequently, in step G, the CPU 101 designates the rectangle generated in step D as a standard rectangle and the rectangle of the group 3 generated in step F as an additional rectangle. The CPU 101 combines these designated rectangles in such away as to locate the additional rectangle on the right side of the standard rectangle. The generated rectangle can be used as a new standard rectangle.

Next, in step H, the CPU 101 determines a vertical/horizontal combination direction of the next group (i.e., the final group 4) based on a comparison between an aspect ratio (height÷width) of the rectangle generated in step G and an aspect ratio (height÷width) of the layout area. In FIG. 11, the layout area is indicated by a dotted line. The aspect ratio of the layout area is greater than the aspect ratio of the standard rectangle. Therefore, the CPU 101 designates the horizontal combination for the final group 4. In the present exemplary embodiment, it is presumed that the CPU 101 designates the left combination as a result of random selection between the right and left combinations.

Subsequently, in step I, the CPU 101 generates a rectangle composed of five frames (i.e., a frame 7, a frame 8, a frame 9, a frame 10, and a frame 11). As the combination designated for the group 4 is the horizontal combination, the CPU 101 selects a pattern 5-2 illustrated in FIG. 10-2D. First, according to the pattern 5-2, the CPU 101 designates the frame 8 as a standard rectangle and the frame 9 as an additional rectangle. The CPU 101 combines the frame 8 with the frame 9 in such a way as to arrange these frames in the horizontal direction.

Then, the CPU 101 designates the rectangle obtained by the above-described horizontal combination as an additional rectangle and the frame 7 as a standard rectangle. The CPU 101 combines the obtained rectangle with the frame 7 in such a way as to arrange them in the vertical direction. Further, the CPU 101 designates the frame 10 as a standard rectangle and the frame 11 as an additional rectangle. The CPU 101 combines the frame 10 with the frame 11 in such a way as to arrange these frames in the horizontal direction.

Further, the CPU 101 designates the rectangle obtained by the above-described horizontal combination as an additional rectangle and combines the obtained rectangle with the rectangle composed of the frame 7, the frame 8, and the frame 9 in such a way as to arrange them in the vertical direction. A rectangle composed of five frames can be obtained through the above-described processing.

Subsequently, in step J, the CPU 101 designates the rectangle generated in step G as a standard rectangle and the rectangle generated in step I as an additional rectangle. The CPU 101 combines these rectangles in such a way as to locate the additional rectangle on the left side of the standard rectangle. Thus, generation of a rectangular frame group composed of eleven frames is accomplished through the above-described processing.

Information relating to the above-described group divisions, the frame layout/size for m groups, and the frame layout/size in group combinations is occasionally stored in the memory 103. The CPU 101 performs the above-described processing in step S2003.

According to the above-described first exemplary embodiment, even when a combination of two or more images selected by a user remains the same, the layout and the size of each image can be differentiated each time the processing is performed. Accordingly, it is feasible to obtain a transformable and enjoyable print product when a plurality of images is observed as one print product.

Further, the print product does not include any blank portion except for the upper and lower marginal portions and/or the right and left marginal portions. Generation of a useless area can be suppressed. Further, if there is not any user's intent, it is unnecessary to partly delete the images prior to the processing. It is feasible to print the entire image that a user wants to print.

As described above, the CPU 101 calculates a layout of a plurality of images in such a way as to form a rectangle composed of the plurality of neighboring images while maintaining the aspect ratios of respective images. In this respect, the CPU 101 is functionally operable as a calculation unit. The calculated layout is stored in the memory 103. In this respect, the memory 103 is functionally operable as a storage unit.

Further, the CPU 101 calculates a layout of the rectangle of the layout stored in the storage unit and another plurality of images in such a way as to form a rectangle composed of the rectangle of the layout and the plurality of neighboring images while substantially maintaining the aspect ratios thereof. In this respect, the CPU 101 is functionally operable as a second calculation unit.

The layout calculated by the second calculation unit is stored in the storage unit by the CPU 101. In this respect, the CPU 101 is functionally operable as a storage control unit. Further, the CPU 101 determines a layout of a plurality of images based on the layout stored in the storage unit. In this respect, the CPU 101 is functionally operable as an image processing unit.

Next, processing according to a second exemplary embodiment is described below. In the first exemplary embodiment, the layout of frames is determined irregularly. Therefore, the obtained layout may not match user preferences. On the other hand, if all cases are checked thoroughly to obtain an optimum layout that meets user preferences, the number of cases to be checked is huge and an extremely long time is required.

Hence, a printing apparatus according to the second exemplary embodiment employs some checks that standardize undesirable cases and applies the checks to each frame layout, if obtained, and calculates a numerical value that represents an evaluation result.

Figure 12:
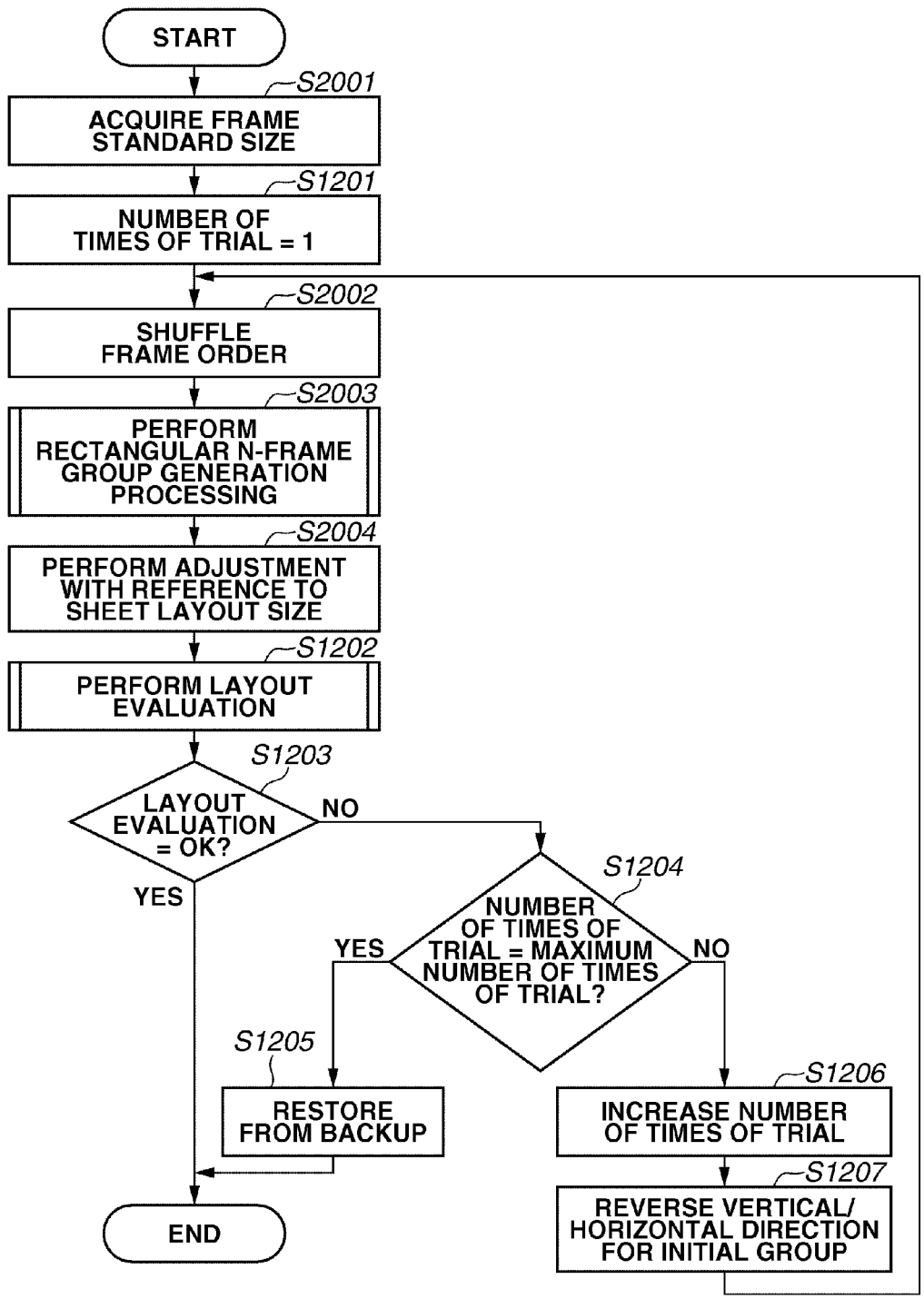
FIG. 12 is a flowchart schematically illustrating frame layout calculation processing according to a second exemplary embodiment of the present invention.

FIG. 12 is a flowchart schematically illustrating the processing to be performed in step S1006 according to the second exemplary embodiment. In the second exemplary embodiment, the CPU 101 selects a frame group layout having a highest evaluation value via layout evaluation on images selected in the previous processing.

First, similar to the first exemplary embodiment, the CPU 101 performs the processing of step S2001.

Next, in step S1201, the CPU 101 sets the number of times of trial to 1. The number of times of trial is a count number that represents the number of times the layout (frame group generation) processing had been performed. Subsequently, similar to the first exemplary embodiment, the CPU 101 performs processing of step S2002 to step S2004.

Subsequently, in step S1202, the CPU 101 evaluates the layout of a rectangular frame group generated in step S2003. A detailed content of the processing is described below.

Next, in step S1203, the CPU 101 determines whether the evaluation result in step S1202 is OK or NG. If it is determined that the evaluation result is OK (YES in step S1203), the CPU 101 terminates the processing of the flowchart illustrated in FIG. 12. On the other hand, if it is determined that the evaluation result is NG (NO in step S1203), the processing proceeds to step S1204 to newly determine a layout of frames.

In step S1204, the CPU 101 determines whether the number of times of trial has reached a maximum number of times of trial. If it is determined that the number of times of trial has reached the maximum number of times of trial (YES in step S1204), the processing proceeds to step S1205. If it is determined that the number of times of trial has not yet reached the maximum number of times of trial (NO in step S1204), the processing proceeds to step S1206.

In step S1205, the CPU 101 does not generate any new layout and restores, from backup data, a layout having the highest evaluation value in the layout evaluation in step S1202. Then, the CPU 101 terminates the processing of the flowchart illustrated in FIG. 12. On the other hand, in step S1206, the CPU 101 increases the number of times of trial.

If the processing in step S1206 is completed, then in step S1207, the CPU 101 performs a setting for the next layout in such a way as to reverse the vertical/horizontal direction of the layout for an initial group number in step S3004 compared to that in the presently performed layout generation. Then, the processing returns to step S2002 to shuffle order of the frames.

As a result of the above-described processing, each time the layout is newly generated, the shuffle of the frame order is carried out and the group layout direction are switched. The frame layout can be greatly changed and various layouts can be realized.

Next, the processing (layout evaluation check) to be performed in step S1202 is described below. In the present exemplary embodiment, the CPU 101 performs the evaluation based on results of a cruciform check, an image size difference check, a minimum image check, and a blank check. A detailed content of each check is described below.

<Cruciform Check>

Figure 13:
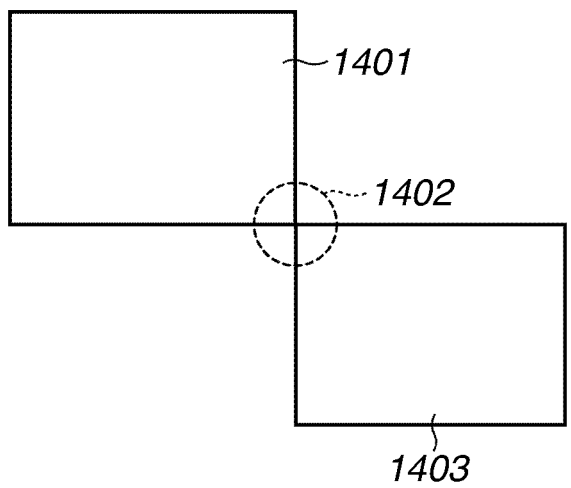
FIG. 13 illustrates an example content of cruciform check.

The cruciform check is a check that includes making an error decision in a case where a connecting state of two frames is similar to a cruciform. More specifically, the "cruciform" indicates a state where neighboring corners of four images are positioned closely to one point. For example, as illustrated in FIG. 13, if a lower right corner of a frame 1401 and an upper left corner of a frame 1403 are positioned within a predetermined distance, an error decision is made.

For example, the cruciform check includes setting a circle 1402 having a predetermined radius with its center positioned on the lower right corner of the frame 1401 and making an error decision if the upper left corner of the frame 1403 is included in the circle 1402. If the above-described cruciform is detected at many portions, it can be evaluated that the images are arranged regularly. The frame layout is boring as a whole. In the present exemplary embodiment, the error score becomes 10.

<Image Size Difference Check>

The image size difference check is a check that includes calculating a ratio of a maximum frame area to a minimum frame area, among a plurality of frames to be disposed, and making an error decision if the calculated ratio is equal to or greater than 20 times. More specifically, the image size difference check is performed based on a size difference between a maximum frame and a minimum frame. If the image size difference is excessively large, the layout may give disorganized impression as a whole. In the present exemplary embodiment, the error score becomes 20 if the difference is equal to or greater than 20 times and smaller than 40 times, and is set to 40 when the difference is equal to or greater than 40.

<Minimum Image Size Check>

The minimum image size check is a check that includes making an error decision if the area of a minimum frame to be disposed is equal to or less than 10000. In general, zooming an image to an excessively small size is difficult because there are a significant number of hardware devices to be restrictive with respect to the reduction of images to assure discriminability of each image. In this case, the error score is set to 40.

<Blank Check>

The blank check is a check that includes calculating an area (ratio) of the images subjected to the frame layout processing on an output sheet and making an error decision if the area (ratio) is equal to or less than 80%. The blank check is useful to print the images as large as possible on the output sheet. However, the occupation rate is included in a below-described score calculation. Therefore, the blank check itself does not cause any error.

Figure 14:
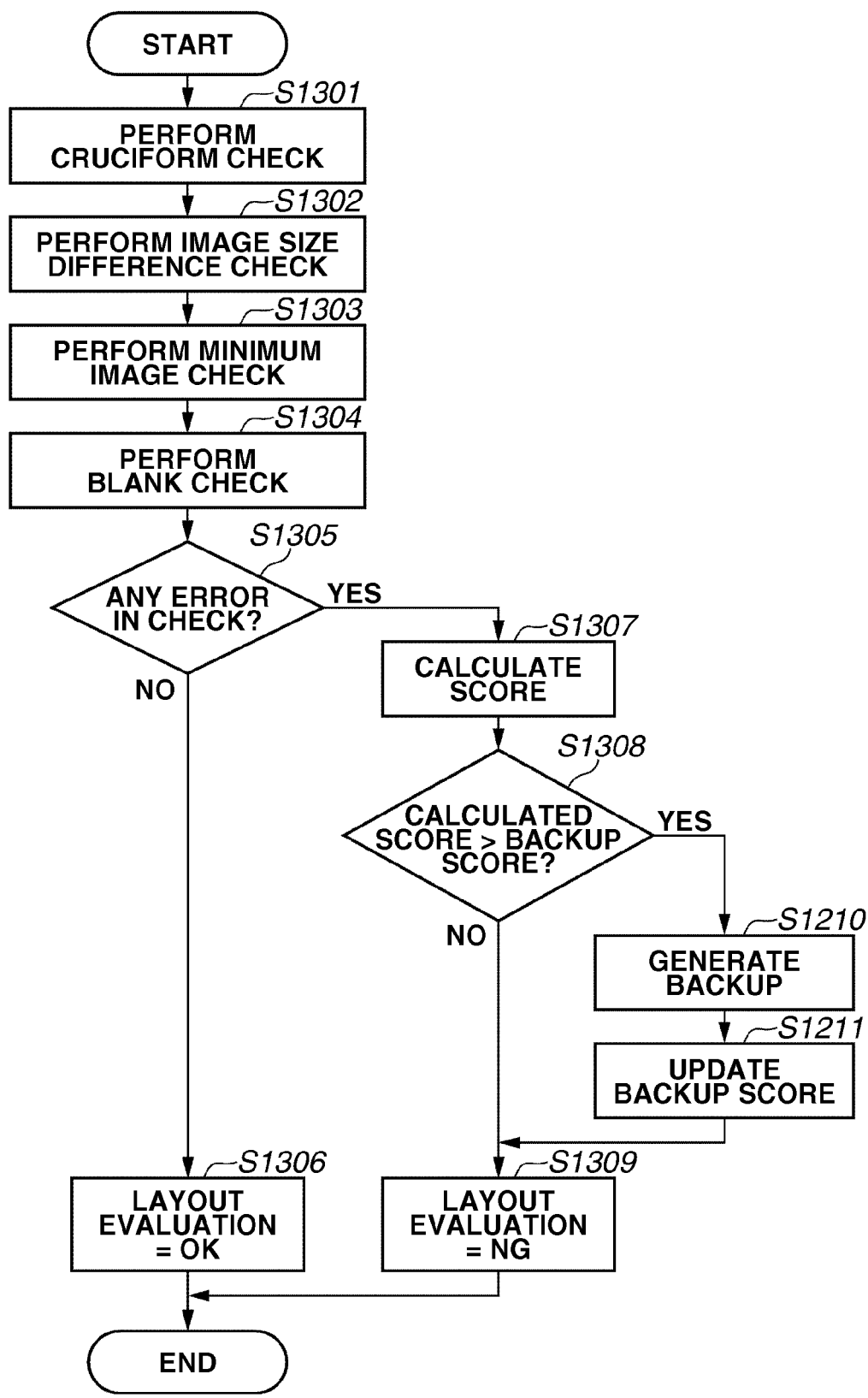
FIG. 14 is a flowchart illustrating a detailed content of layout evaluation processing according to the second exemplary embodiment of the present invention.

FIG. 14 is a flowchart illustrating details of the layout evaluation processing to be performed in step S1202. As a detailed content of the processing in step S1202, the CPU 101 sequentially performs the cruciform check (in step S1301), the image size difference check (in step S1302), the minimum image check (in step S1303), and the blank check (in step S1304) for each frame included in the rectangular frame group.

Next, in step S1305, the CPU 101 determines whether there is any error in respective checks performed in steps S1301 to S1304. Then, if there is not any error (NO in step S1305), then in step S1306, the CPU 101 sets "OK" as a layout evaluation of the frame group and terminates the processing of step S1202.

On the other hand, if there is an error (YES in step S1305), then in step S1307, the CPU 101 calculates a score. In the present exemplary embodiment, the score is expressed as "score=image occupation rate−sum of error scores in respective checks." The minimum score can be obtained when the image occupation rate is 0 and the error scores in respective checks are maximized. In this case, the minimum score is equal to −90.

If the processing in step S1307 is completed, then in step S1308, the CPU 101 compares the score calculated in step S1307 with a backup score. If the score calculated in step S1307 is higher than the backup score (YES in step S1308), the processing proceeds to step S1310. If the score calculated in step S1307 is not higher than the backup score (NO in step S1308), the processing directly proceeds to step S1309 because the evaluation value of the layout of a backed-up frame group is higher than the evaluation value of the layout of the presently generated frame group.

In step S1310, the CPU 101 generates a backup of the presently generated layout. More specifically, the CPU 101 stores layout information of each frame included in the frame group into the memory 103.

Next, in step S1311, the CPU 101 updates (replaces) the previously stored backup score with the present score. Through the above-described operation, the layout of a frame group having the highest evaluation value can be constantly stored as backup data in a case where an error is detected in any one of the checks.

In step S1309, i.e., after completing the processing in step S1308 or step S1311, the CPU 101 sets "NG" as a layout evaluation and terminates the processing of step S1202. If an initial value of the backup score is set to −90, a score lower than the initial value cannot be obtained. Therefore, a backup score and a layout are generated if an error is detected in any one of the checks.

According to the above-described second exemplary embodiment, if an error is detected in any one of the checks, the CPU 101 determines a layout of frames by changing the conditions until the number of times reaches a predetermined value and employs a layout having the highest score. Therefore, the printing apparatus can perform printing using a layout reflecting user preferences.

Further, as an upper limit can be appropriately set for the number of repetitions (step S1204), it becomes feasible to reduce the waiting time for users compared to a case where all patterns are checked thoroughly.

It is useful to disable each of the above-described checks or change the error score with reference to the number of selected images and the size of a printing sheet. For example, the cruciform check does not outstand if the number of images becomes larger. Therefore, the cruciform check result is negligible if the number of the selected images exceeds eight.

Further, if the sheet size becomes larger, no problem will occur when the image size difference slightly increases. Therefore, it is effective to decrease the error score by an amount of 10 in the print layout for 2 L or a larger size. If the above-described setting is performed, the control for each check can be performed finely and accurately.

Next, example processing according to a third exemplary embodiment is described below. In the third exemplary embodiment, a main image illustrated in FIG. 1 can be surely disposed in a large frame of a resulting print. The third exemplary embodiment is similar to the second exemplary embodiment in its basic operation. Therefore, a description for the same processing is not repeated.

The processing according to the third exemplary embodiment is described below with reference to FIG. 15. In the third exemplary embodiment, to locate a main image in a large frame, the CPU 101 executes the processing illustrated in FIG. 15 between step S2003 and step S2004 illustrated in FIG. 12.

First, in step S1501, the CPU 101 determines whether the main image is disposed in the largest frame to check if a frame corresponding to the main image is disposed largely among the rectangles generated in step S2003. If the frame corresponding to the main image is the largest (YES in step S1501), the processing directly proceeds to step S2004. If the frame corresponding to the main image is not the largest (NO in step S1501), then in step S1502, the CPU 101 determines whether the aspect ratio of the largest frame (or the aspect ratio of an image corresponding to the frame) is equal to the aspect ratio of the main image frame (or the aspect ratio of the main image).

If it is determined that the compared aspect ratios are identical to each other (YES in step S1502), then in step S1503, the CPU 101 replaces a layout for the image disposed in the largest frame by a layout for the main image. More specifically, the CPU 101 locates the main image in the largest frame and moves the image previously disposed in the largest frame to the frame in which the main image is previously disposed.

In this case, no blank is newly generated or the images are not partly cut because the switched images are mutually the same in aspect ratio. If it is determined that the aspect ratio of the largest frame is different from the aspect ratio of the main image frame (NO in step S1502), the processing returns to step S2002. The CPU 101 shuffles order of the frames and restarts the rectangle generation processing.

Figure 15:
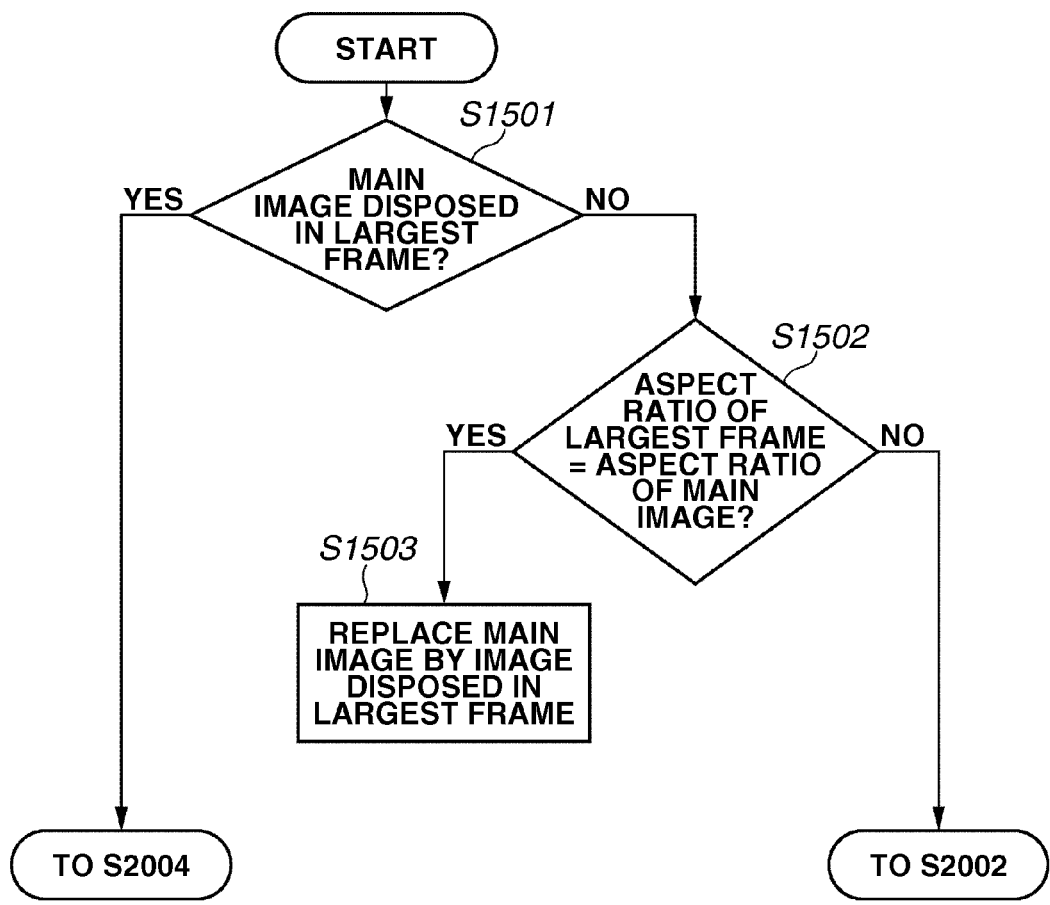
FIG. 15 is a flowchart schematically illustrating an example content of processing according to a third exemplary embodiment of the present invention.

When the processing illustrated in FIG. 15 is executed, the main image can be located in the largest frame.

As described above, in step S1501 illustrated in FIG. 15, the CPU 101 checks if the main image is disposed in the largest frame. However, it may be acceptable to modify the flowchart to allow the processing to directly proceed from step S1501 to step S2004 in a case where the main image is disposed in the first, second or third largest frame. Even in such a case, it is desired to switch the largest frame image and the main image if their aspect ratios are similar to each other.

Further, a user can select the main image beforehand using the operation unit 105. Alternatively, the main image can be automatically determined according to favorite information or importance information attached to an image.

In the above-described exemplary embodiment, the processing illustrated in FIG. 15 intervenes between step S2003 and step S2004. However, the processing illustrated in FIG. 15 can be included in the processing of step S2003. For example, the processing illustrated in FIG. 15 can be executed after respective groups are combined. If the processing illustrated in FIG. 15 is performed when the groups are combined, the determination can be quickly accomplished in a case where restarting the processing is necessary. Thus, the CPU 1010 is not required to execute useless processing.

As described above, the layout according to the third exemplary embodiment can locate a plurality of images designated by a user without causing any clearance on a sheet layout, except for the upper and lower marginal portions and/or the right and left marginal portions. Further, a specific main image can be disposed largely.

OTHER EMBODIMENTS

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2010-163301 filed Jul. 20, 2010 and No. 2010-194047 filed Aug. 31, 2010, which are hereby incorporated by reference herein in their entirety.

What is claimed is:

1. An image processing apparatus that can automatically arrange a plurality of images in such a way as to calculate a layout of the plurality of images while maintaining an aspect ratio of each image, the image processing apparatus comprising:
   a rectangle generation unit configured to divide the plurality of images into two or more groups and generate, for each group, a rectangle in which images of the group can be arranged, wherein the rectangle generation unit generates the rectangle in such a way as to locate the images belonging to the same group in one rectangle;
   a rectangle combination unit configured to generate a new rectangle by combining two of the rectangles generated by the rectangle generation unit, wherein the rectangle combination unit is further configured to perform generation of another new rectangle by combining the rectangle generated by the rectangle combination unit with a rectangle generated by the rectangle generation unit; and
   a determination unit configured to cause the rectangle combination unit to repeat rectangle combination to generate a rectangle composed of the plurality of groups, in which all of the plurality of images are disposed, and configured to determine a layout of the plurality of images.

2. The image processing apparatus according to claim 1, further comprising:
   an image generation unit configured to generate an image of the plurality of images disposed in one rectangle based on the layout of the plurality of images determined by the determination unit.

3. The image processing apparatus according to claim 1, wherein the rectangle generation unit is configured to generate the rectangle in which the images of the group can be arranged based on a predetermined layout pattern according to the number of the images disposed in the group.

4. The image processing apparatus according to claim 1, wherein the rectangle generation unit is configured to generate the rectangle by adjusting the size of each image included in the group while maintaining the aspect ratio of the image.

5. The image processing apparatus according to claim 1, wherein when two rectangles are combined, the rectangle combination unit is configured to adjust sizes of these two rectangles in such a way as to maintain the aspect ratio of each rectangle.

6. The image processing apparatus according to claim 1, wherein when two rectangles are combined, the rectangles are combinable in a vertical direction or in a horizontal direction, and the rectangle combination unit is configured to combine the rectangles in a direction different from the direction for a previous rectangle combination.

7. The image processing apparatus according to claim 6, wherein when a rectangle of a final group is added, the rectangle combination unit is configured to combine the rectangle of the final group in a direction corresponding to a sheet direction, not the direction different from the direction for the previous rectangle combination.

8. The image processing apparatus according to claim 1, further comprising:
   an evaluation unit configured to evaluate a layout of the plurality of images determined by the determination unit,
   wherein if the evaluation unit determines that predetermined conditions are not satisfied, a layout of frames of the plurality of images is newly determined by the rectangle generation unit, the rectangle combination unit, and the determination unit.

9. The image processing apparatus according to claim 8, wherein the evaluation unit is configured to evaluate the layout of the plurality of images with reference to a result of a check if corners of four images are positioned closely to one point when the plurality of images are arranged according to the layout determined by the determination unit.

10. The image processing apparatus according to claim 8, wherein in the layout determined by the determination unit, the evaluation unit is configured to evaluate the layout of the plurality of images according to a size difference between a maximum size image and a minimum size image.

11. The image processing apparatus according to claim 8, wherein in the layout determined by the determination unit, the evaluation unit is configured to evaluate the layout of the plurality of images according to the size of a minimum size image.

12. The image processing apparatus according to claim 8, further comprising:
   an adjustment unit configured to adjust the size of the rectangle in which all of the plurality of images are disposed in such a way that the rectangle in which all of the plurality of images are disposed in the layout determined by the determination unit can be accommodated within a rectangle of a layout area having been set beforehand and can be inscribed in the rectangle of the layout area,
   wherein the evaluation unit is configured to evaluate the layout of the plurality of images with reference to a ratio of the rectangle in which all of the plurality of images are disposed, to the rectangle of the layout area.

13. The image processing apparatus according to claim 1, further comprising:
   an adjustment unit configured to adjust the size of the rectangle in which all of the plurality of images are disposed in such a way that the rectangle in which all of the plurality of images are disposed in the layout determined by the determination unit can be accommodated within a rectangle of a layout area having been set beforehand and can be inscribed in the rectangle of the layout area.

14. The image processing apparatus according to claim 1, wherein the rectangle generation unit is configured to rotate an image based on information relating to the rotation associated with the image and use the rotated image to generate the rectangle in which the images of the group can be arranged.

15. The image processing apparatus according to claim 14, wherein the rectangle generation unit is configured to use, as the information relating to the rotation, information associated with the image or image relevant information designated by a user.

16. The image processing apparatus according to claim 1, further comprising a control unit configured to control the rectangle generation unit or the determination unit in such a way that a specific image is arranged in a large size.

17. The image processing apparatus according to claim 16, wherein in the layout determined by the determination unit, if the disposed specific image does not have the large size, the control unit is configured to replace a layout for an image that has an aspect ratio similar to that of the specific image and has a large size in a disposed state, by a layout for the specific image.

18. The image processing apparatus according to claim 16, wherein in the layout determined by the determination unit, if an image to be disposed at a maximum size is similar to the specific image in aspect ratio, the control unit is configured to replace a layout for the image to be disposed at the maximum size, by a layout for the specific image.

19. The image processing apparatus according to claim 18, wherein if an aspect ratio of the image to be disposed at the maximum size is different from an aspect ratio of the specific image, the control unit is configured to cause the rectangle generation unit, the rectangle combination unit, and the determination unit to newly determine a layout of frames of the plurality of images.

20. The image processing apparatus according to claim 16, further comprising a selection unit configured to select the specific image from the plurality of images.

21. The image processing apparatus according to claim 1, wherein the image processing apparatus arranges the plurality of images without causing any clearance between neighboring images.

22. The image processing apparatus according to claim 1, wherein the image processing apparatus arranges the plurality of images with a predetermined intervening clearance.

23. The image processing apparatus according to claim 1, further comprising:
a recording unit configured to record an image layout resulting from the rectangle generated by the rectangle generation unit, a layout resulting from the new rectangle generated by the rectangle combination unit, and a layout resulting from the rectangle determined by the determination unit, in which all of the plurality of images are disposed, and
an image generation unit configured to generate an image of the plurality of images arranged based on layout information recorded by the recording unit,
wherein if the layout determination by the determination unit is not finished, a layout is calculated based on an aspect ratio of each image without causing the image generation unit to arrange the images and, if the layout determination by the determination unit is already finished, the image generation unit generates the image of the plurality of images.

24. A method for controlling an image processing apparatus that can automatically arrange a plurality of images in such a way as to maintain an aspect ratio of each image, the method comprising:
dividing the plurality of images into two or more groups and generating, for each group, a rectangle in which images of the group can be arranged, wherein generation of the rectangle is performed in such a way as to locate the images belonging to the same group in one rectangle;
generating a new rectangle by combining two of the generated rectangles, and further generating another new rectangle by combining the combined rectangle with a generated rectangle; and
generating a rectangle composed of the plurality of groups by repeating rectangle combination, in such a way that all of the plurality of images are arranged and determining a layout of the plurality of images.

25. A non-transitory computer readable storage medium storing a program that causes a computer to execute the method for controlling the image processing apparatus defined in claim 24.

* * * * *